US012175877B2

(12) United States Patent
Beard et al.

(10) Patent No.: US 12,175,877 B2
(45) Date of Patent: Dec. 24, 2024

(54) AUTONOMOUS FLIGHT SAFETY SYSTEM

(71) Applicant: GENERAL ATOMICS, San Diego, CA (US)

(72) Inventors: Gary C. Beard, Huntsville, AL (US); Kyle Aven, Batesville, MS (US); Rusty Anderson, Huntsville, AL (US); Keith Helms, Taft, TN (US); Jason Xerri, Madison, AL (US); Luther E. Odom, Jr., Madison, AL (US)

(73) Assignee: General Atomics, San Diego, CA (US)

( * ) Notice: Subject to any disclaimer, the term of this patent is extended or adjusted under 35 U.S.C. 154(b) by 73 days.

(21) Appl. No.: 17/469,024

(22) Filed: Sep. 8, 2021

(65) Prior Publication Data

US 2023/0071617 A1    Mar. 9, 2023

(51) Int. Cl.
   *B64C 17/06*    (2006.01)
   *G05D 1/00*    (2006.01)
   *G08G 5/00*    (2006.01)

(52) U.S. Cl.
   CPC ............ *G08G 5/006* (2013.01); *B64C 17/06* (2013.01); *G05D 1/0088* (2013.01); *G05D 1/0816* (2013.01); *G08G 5/003* (2013.01)

(58) Field of Classification Search
   CPC ........ G08G 5/006; G08G 5/003; B64C 17/06; G05D 1/0088; G05D 1/0816
   See application file for complete search history.

(56) References Cited

U.S. PATENT DOCUMENTS

| 4,470,562 A | * | 9/1984 | Hall | ............... G01C 21/166 244/3.22 |
| 8,868,258 B2 | | 10/2014 | Papadopoulos | |

(Continued)

FOREIGN PATENT DOCUMENTS

WO    2019211875    11/2019

OTHER PUBLICATIONS

PCT; International Search Report and Written Opinion for PCT/US22/32845 issued by the International Searching Authority on Oct. 6, 2022.

*Primary Examiner* — Matthew J. Reda
(74) *Attorney, Agent, or Firm* — Fitch, Even, Tabin & Flannery LLP

(57) ABSTRACT

The present disclosure describes autonomous flight safety systems (AFSSs) that incorporate an autonomous flight termination unit (AFTU) enabling AFSS monitoring for various termination conditions that are used to activate a flight termination system (e.g., in the event a termination condition is detected). Such termination conditions include boundary limit detection (e.g., whether a vehicle position is outside or projected outside a planned flight envelope), as well as body instability detection (e.g., whether a pitch rate and yaw rate exceed some threshold indicative of vehicle instability). For instance, an AFTU may incorporate a three-axis gyroscope sensor and may implement instability detection processing based on information obtained via the sensor. Instability detection processing may include, for example, a BID algorithm that may be implemented by an AFTU to monitor angular rates of the vehicle, to determine if the vehicle is no longer under stable control, and to issue termination commands when termination conditions are detected.

24 Claims, 10 Drawing Sheets

(56) References Cited

U.S. PATENT DOCUMENTS

| | | | |
|---|---|---|---|
| 9,310,222 B1 | 4/2016 | Suiter | |
| 9,689,684 B2 | 6/2017 | Sheard | |
| 10,323,906 B2 | 6/2019 | DeJong | |
| 2007/0063095 A1* | 3/2007 | Bittle | F42B 10/661 244/3.21 |
| 2009/0326851 A1* | 12/2009 | Tanenhaus | G01C 21/1654 702/96 |
| 2011/0049289 A1* | 3/2011 | Kinsey, Jr. | F42B 10/661 244/3.22 |
| 2012/0048993 A1* | 3/2012 | Velez | F42B 10/48 244/3.28 |
| 2014/0067164 A1* | 3/2014 | Papadopoulos | B64G 1/002 701/3 |
| 2014/0316616 A1* | 10/2014 | Kugelmass | G05D 1/104 701/8 |
| 2017/0016728 A1* | 1/2017 | Sheard | G05D 1/10 |
| 2018/0094903 A1* | 4/2018 | DeJong | B64D 1/04 |
| 2018/0096609 A1 | 4/2018 | De La Cruz | |
| 2020/0156790 A1 | 5/2020 | Von Flotow | |

* cited by examiner

AUTONOMOUS FLIGHT SAFETY SYSTEM

BACKGROUND OF THE INVENTION

1. Field of the Invention

The present invention relates generally to flight safety, and more specifically to autonomous flight termination.

2. Discussion of the Related Art

Various systems and processes are known in the art for flight safety.

Object tracking is the process of utilizing sensors in combination with a known reference point to determine a desired positional fix, and possibly a dynamic fix of an object of interest. The degree of desired fix is specifically determined by collecting and correlating information related to parameters such as time, space and position information. Additionally, by integrating the product of these parameters, one can easily arrive at additional descriptive indicators such as velocity, acceleration, jerk, twisting motions and trajectories.

Radar-based architectures for tracking rockets and similar vehicles ushered in the foundational modern-day concepts of aerial vehicle tracking. The integration and use of these radar assets have synergistically enabled the field of rocketry to evolve into highly sophisticated systems such as the space shuttle. Such launch vehicles require the use of precise sophisticated tracking radars primarily for safety reasons. Specifically, a trajectory orbit monitoring officer uses accurate real-time position and velocity data to determine if a launch vehicle has strayed off course during the boost phase. The officer then has the option to safely destroy the vehicle before it can become a hazard to life or property.

Systems have also been proposed for moving some of the real-time trajectory sensing and tracking function from traditional ground/air-based radar systems to systems on board the aerial vehicle itself. However, these systems still include the monitoring officer to interpret the trajectory information and make decisions about flight termination based on the trajectory information transmitted from the aerial vehicle.

There is a need for flight safety systems that can rapidly make decisions to terminate the flight of aerial vehicles. One such need is for methods and apparatuses that determine flight characteristics of an aerial vehicle and make flight termination decisions autonomously rather than the man-in-the-loop systems that are currently proposed.

SUMMARY

The present disclosure describes autonomous flight safety systems (AFSSs) that incorporate an autonomous flight termination unit (AFTU) enabling AFSS monitoring for various termination conditions that are used to activate a flight termination system (e.g., in the event a termination condition is detected). Such termination conditions include boundary limit detection (e.g., whether a vehicle position is outside a planned flight envelope), as well as body instability detection (BID) (e.g., whether a pitch rate and yaw rate exceed some threshold indicative of vehicle instability). For instance, an AFTU may incorporate a three-axis gyroscope sensor and may implement instability detection processing based on information obtained via the sensor. Instability detection processing may include, for example, a BID algorithm that may be implemented by an AFTU to monitor angular rates of the vehicle, to determine if the vehicle is no longer under stable control, and to issue termination commands when termination conditions are detected.

An apparatus, system, and method for autonomous flight termination are described. One or more embodiments of the apparatus, system, and method include a position sensing system, a three-axis gyro, a processor, and a termination system. The processor may be adapted to receive repeatedly a location signal indicative of a position in three-dimensional space of a launch vehicle, compare repeatedly the position indicated by the location signal with a planned flight envelope, receive repeatedly a gyro signal indicative of a pitch rate and yaw rate of the launch vehicle, and compare repeatedly the pitch rate and yaw rate indicated by the gyro signal with a maximum prescribed pitch rate and yaw rate. The processor may further be adapted to activate a flight termination system in the event at least one termination condition selected from a group of termination conditions is detected, the group of termination conditions consisting of: the position being outside the planned flight envelope, the pitch rate and yaw rate exceeding the maximum prescribed pitch rate and yaw rate, and combinations thereof. The termination system may be configured to initiate a termination of the launch vehicle in response to activation of the flight termination system.

A method, apparatus, non-transitory computer readable medium, and system for autonomous flight termination are described. One or more embodiments of the method, apparatus, non-transitory computer readable medium, and system include receiving repeatedly a location signal indicative of a position in three-dimensional space of a launch vehicle, comparing repeatedly the position indicated by the location signal with a planned flight envelope, receiving repeatedly a gyro signal indicative of a pitch rate and yaw rate of the launch vehicle, and comparing repeatedly the pitch rate and yaw rate indicated by the gyro signal with a maximum prescribed pitch rate and yaw rate. The method may further include activating a flight termination system in the event at least one termination condition selected from a group of termination conditions is detected, the group of termination conditions consisting of: the position being outside the planned flight envelope, the pitch rate and yaw rate exceeding the maximum prescribed pitch rate and yaw rate, and combinations thereof.

DETAILED DESCRIPTION

Figure 1:
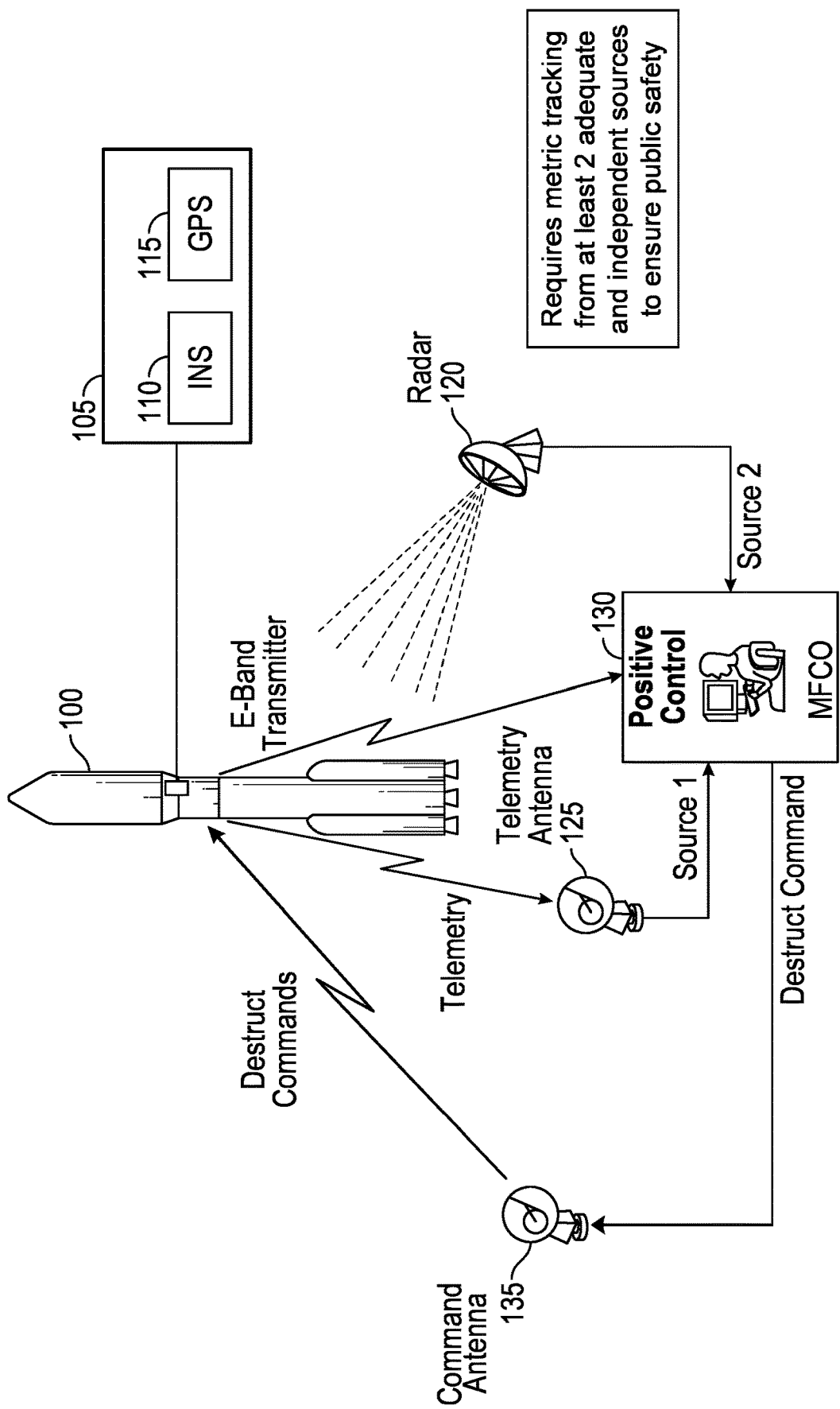
FIG. 1 shows an example of a flight safety system according to aspects of the present disclosure.

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Some autonomous flight safety systems (AFSSs) may monitor a vehicle's position relative to set boundary limits (e.g., set boundary limits defined by a flight or mission, such as in a mission data load (MDL) file). Such systems may determine whether or not a vehicle has crossed safe operating limits of a flight path. However, some systems may not provide means to determine if the vehicle is stable within such safe operating limits. Accordingly, AFSSs may be deficient in scenarios where a vehicle is instable (e.g., tumbling out of control) while maintaining position within defined boundary limits of a MDL file. In other words, some AFSSs may not be capable of determining or detecting a vehicle instability safety concern if the vehicle maintains position within defined boundary limits of a MDL file (e.g., when a vehicle is tumbling out of control within mission defined boundary limits). As AFSSs may not have the inherent ability to detect instability or tumbling, such AFSSs may not be able to generate termination commands (e.g., mission termination commands, such as commands for termination of the launch vehicle) based on vehicle instability, which may result in deficient safety systems.

The present disclosure describes AFSSs that incorporate an autonomous flight termination unit (AFTU) enabling AFSS monitoring of additional modes of failure (e.g., such as vehicle instability, which may pose mission safety concerns). Generally, a processor (e.g., a processor of an AFTU) may monitor for various termination conditions and may activate a flight termination system in the event a termination condition is detected. According to the techniques described herein, termination conditions that may be monitored and detected include boundary limit detection (e.g., whether a vehicle position is outside a planned flight envelope), as well as body instability detection (BID) (e.g., whether a pitch rate and yaw rate exceed some threshold indicative of vehicle instability).

For instance, an AFTU may incorporate (e.g., and/or receive signals from) an independent sensor, such as a three-axis gyroscope, and may implement instability detection processing based on information obtained via the sensor. Instability detection processing may include, for example, a BID algorithm that may be implemented by an AFTU (e.g., or BID hardware of an AFTU) to monitor angular rates of the vehicle, to determine if the vehicle is no longer under stable control, and to issue termination commands when termination conditions are detected. The output of the instability detection processing may be provided to core autonomous safety software (CASS) (e.g., via user-definable features) provided by the CASS. According to some aspects of the present disclosure, termination conditions may be defined within a MDL file (e.g., as with other sensors) as functions of the output parameters from the instability detection processing. CASS of the AFTU may issue any termination decisions based on the MDL file. In some examples, use of an internal or external three-axis gyro and associated processing within the AFTU (e.g., such as instability detection processing) may enable completion of a fully integrated, robust, and autonomous flight safety solution.

An AFTU described herein may be included as a fly-away component of an AFSS executing a mission (e.g., a MDL file described by a planned flight envelope, a mission planning team, etc.). The AFTU may provide on-board range safety by independently monitoring vehicle dynamics to destruct a missile system if certain failure conditions are observed. In some examples, the position of the vehicle is monitored and compared to a mission (e.g., a MDL file) to verify the vehicle is within limited bounds. Further, in accordance with the present disclosure, additional modes of failure may be monitored by an AFTU. For instance, each AFTU may provide an independent sensor (e.g., such as an independent MEMS based 3-axis gyro) to monitor vehicle body rates which enhances missile system monitoring through the planned flight envelope. The body rates may be fed to some instability detection processing (e.g., such as a body instability detector (BID) algorithm developed by General Atomics Electromagnetic Systems (GA-EMS) to execute within each AFTU). An AFTU (e.g., a GA-EMS AFTU) may offer an enhanced capability (e.g., such as instability detection monitoring, launch vehicle termination, etc.) to detect and decisively respond to failure scenarios that occur too rapidly for response times of typical flight termination system approaches.

FIG. 1 shows an example of a flight safety system according to aspects of the present disclosure. The example shown includes vehicle 100, onboard sensors 105, INS 110, GPS receiver 115, radar system 120, telemetry antenna 125, MFCO 130, and command antenna 135.

FIG. 1 illustrates an example of a flight safety system. A vehicle 100 (e.g., a launch vehicle 100, an aerial vehicle 100, etc.) may include onboard sensors 105, such as an INS 110 and a GPS receiver 115. The vehicle 100 position or sensor data may be downlinked (telemetry) to a telemetry antenna 125 at a ground station. The vehicle 100 may include communication devices (e.g., an E-band transponder and antennas) to transmit flight termination system health data provided to the vehicle's telemetry system to a Missile Flight Control Officer (MFCO 130). An independent radar system 120 may track the vehicle 100 to determine the flight trajectory of the vehicle 100.

The MFCO 130 may use information from the radar system 120 and the telemetry antenna 125 to determine if the vehicle 100 has violated flight safety criteria (e.g., which may include a human decision process). If there has been a violation, the MFCO 130 may activate a signal as a command that is transmitted from a command antenna 135 to the vehicle 100. The signal is received by the vehicle 100 and the signal may cause the vehicle 100 to terminate the flight. This process may depend on highly reliable hardware, which has been thoroughly certified and tested and implemented with redundancy on various subsystems of the flight safety system, as well as highly trained personnel (e.g., human personnel who are certified for the role of a MFCO 130).

A command antenna, telemetry antenna, and other antennas described herein may include a single antenna, or more than one antenna, which may be capable of concurrently transmitting or receiving multiple transmissions (e.g., wireless transmissions). In some cases, an antenna may include or refer to an antenna array.

A transceiver may communicate bi-directionally, via antennas, wired, or wireless links as described above. For example, the transceiver may represent a wireless transceiver and may communicate bi-directionally with another wireless transceiver. The transceiver may also include or be connected to a modem to modulate the packets and provide the modulated packets for transmission, and to demodulate received packets. In some examples, transceiver may be tuned to operate at specified frequencies. For example, a modem can configure the transceiver to operate at a specified frequency and power level based on the communication protocol used by the modem.

Vehicle 100 is an example of, or includes aspects of, the corresponding element described with reference to FIG. 2. INS 110 is an example of, or includes aspects of, the corresponding element described with reference to FIG. 7. GPS receiver 115 is an example of, or includes aspects of, the corresponding element described with reference to FIGS. 5-8.

Figure 2:
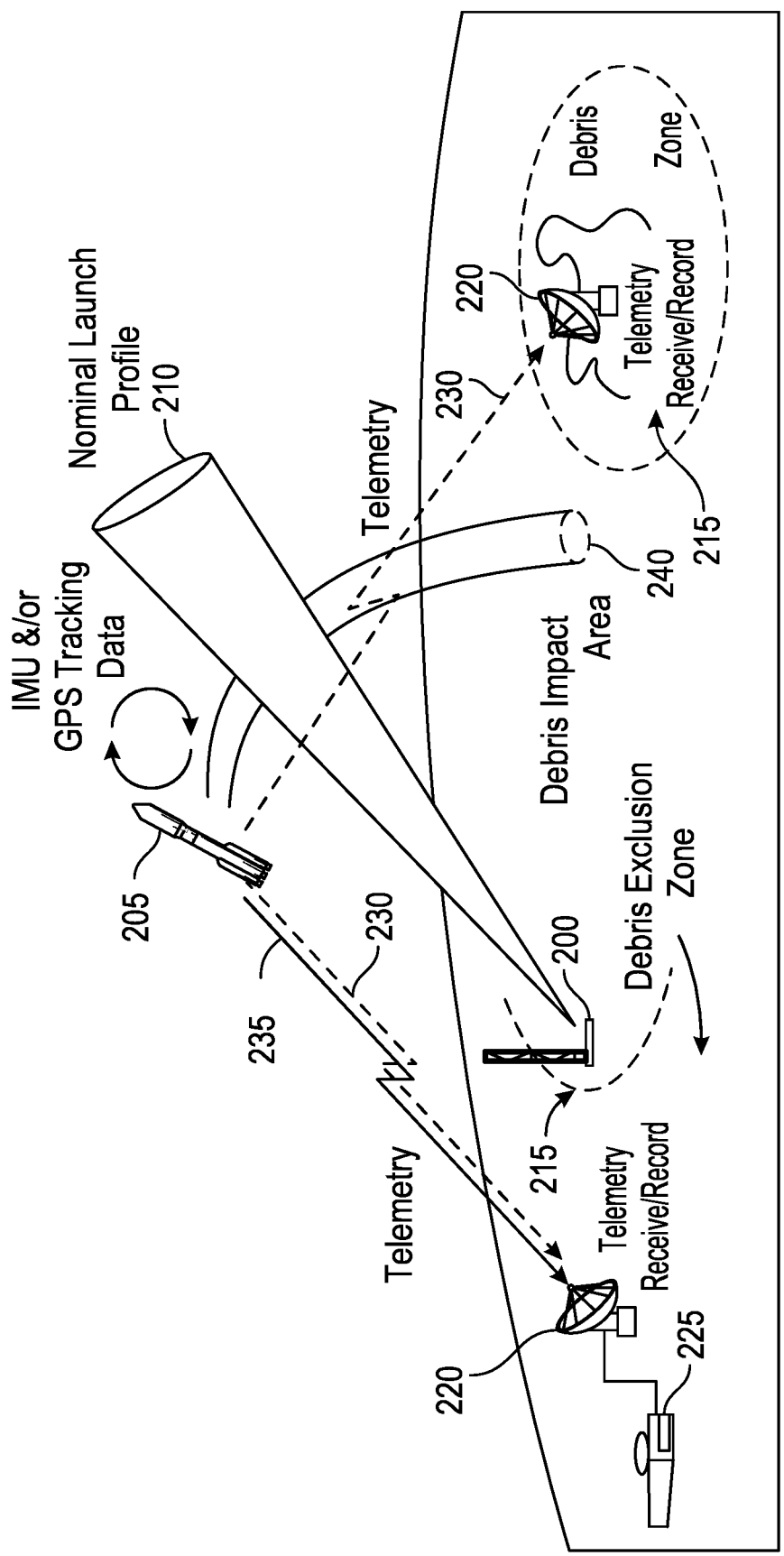
FIG. 2 shows an example of a vehicle launch profile according to aspects of the present disclosure.

FIG. 2 shows an example of a vehicle launch profile according to aspects of the present disclosure. The example shown includes launch site 200, vehicle 205, nominal launch profile 210, debris exclusion zones 215, ground stations 220, mission control center 225, telemetry data 230, near real time telemetry data 235, and debris impact area 240.

FIG. 2 illustrates an example of a vehicle 205 launch profile. A vehicle 205 (e.g., a launch vehicle 205, an aerial vehicle 205, etc.) may be launched from a launch site 200. A nominal launch profile 210 shows a profile that the vehicle 205 should stay within for a nominal launch. Debris exclusion zones 215 illustrate areas where there may be a safety issue if the vehicle 205 were to impact the Earth within these areas.

In some safety systems, telemetry data 230 may be transmitted to ground stations 220. This telemetry data 230 may be non-real-time information about the vehicle 205, such as health of the vehicle 205 and status of internal systems. Near real time telemetry data 235 may be transmitted to the ground station and may include information about the flight trajectory (or vehicle 205 trajectory) of the vehicle 205 for analysis by a flight control officer (not shown) at a mission control center 225. The flight control officer (e.g., a MFCO) uses the flight trajectory information to determine if the flight should be terminated. If the vehicle 205 remains within the nominal launch profile 210, the flight control officer is not likely to terminate the flight. In some examples, there may be other reasons to terminate the flight, which may be related to the non-real-time telemetry data 230.

The vehicle 205 is illustrated as outside the nominal launch profile 210 and if the flight is terminated at this time, the vehicle 205 would return to Earth within a debris impact area 240. On the present course, the debris impact area 240 has not encroached on one of the debris exclusion zones 215. Therefore, the flight control officer may let the flight continue because the vehicle 205 and/or flight may not pose a threat to the debris exclusion zones 215. In embodiments of the present disclosure, decision processes about terminating the flight of the vehicle 205 are made autonomously on board the vehicle 205 if the debris impact area 240 encroaches on one or more of the debris exclusion zones 215.

Vehicle 205 is an example of, or includes aspects of, the corresponding element described with reference to FIG. 1. Telemetry data 230 is an example of, or includes aspects of, the corresponding element described with reference to FIG. 4.

Figure 3:
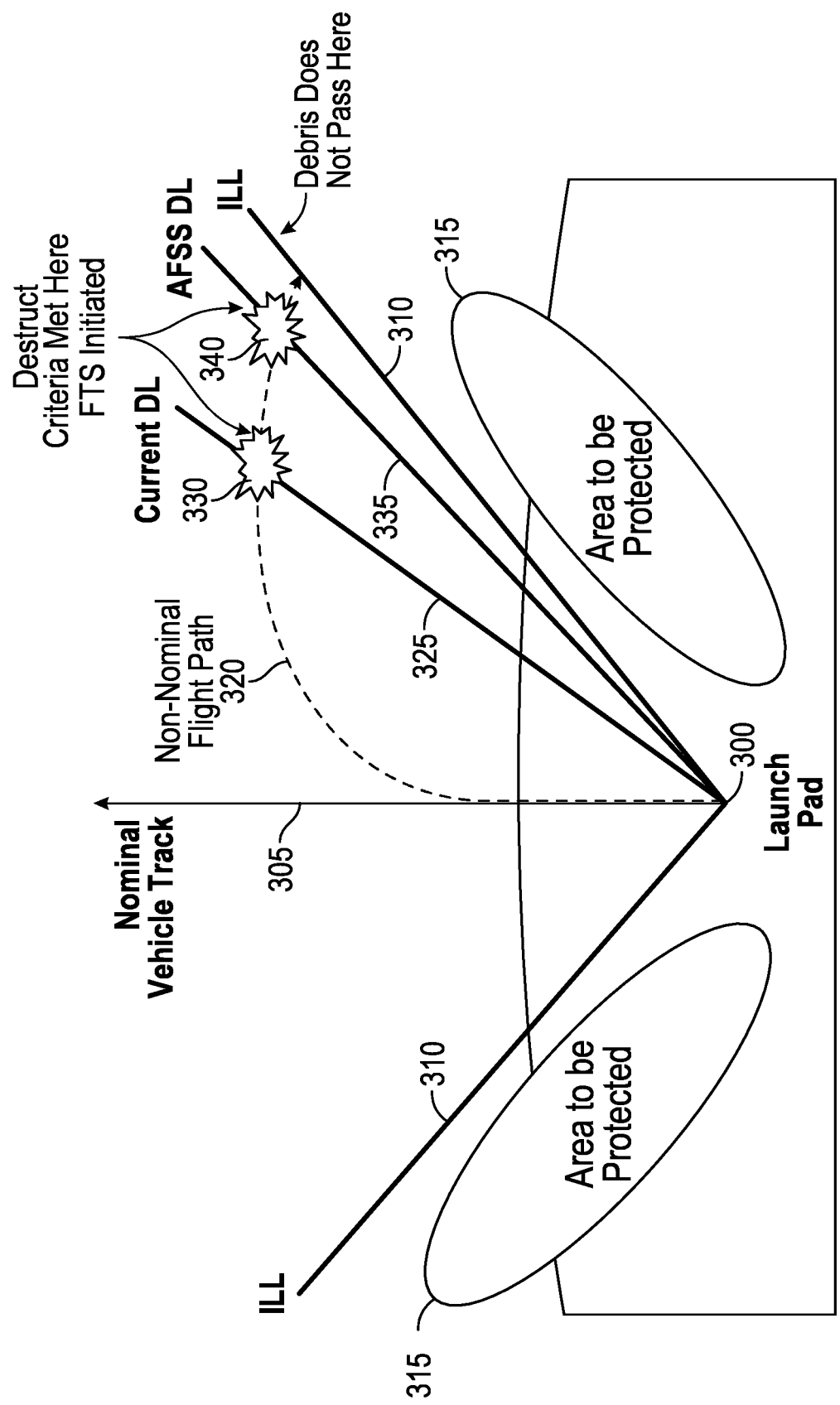
FIG. 3 shows an example of a vehicle termination diagram according to aspects of the present disclosure.

FIG. 3 shows an example of a vehicle termination diagram according to aspects of the present disclosure. The example shown includes launch pad 300, nominal vehicle track 305, impact limit lines 310, protected areas 315, non-nominal flight path 320, current destruct line 325, termination point 330, and AFSS destruct line 335.

FIG. 3 illustrates improvements to a flight termination decision with one or more embodiments of the present disclosure. A vehicle (e.g., a launch vehicle, an aerial vehicle, etc.) may be launched from a launch pad 300. A nominal vehicle track 305 shows the track that a vehicle may follow (e.g., for a normal flight, for a path according to a planned flight envelope, etc.). Two areas to be protected (e.g., protected areas 315) are illustrated as areas on the Earth that should be protected from an errant flight or a terminated flight.

Impact limit lines 310 show lines extending from the launch site that debris must not pass to ensure that debris from the vehicle does not land within the protected areas 315. Thus, as long as the flight path of the vehicle remains within the impact limit lines 310 (e.g., or as long as a vehicle does not deviate from a planned flight envelope beyond some acceptable margin threshold), the vehicle and flight may be considered to be in a safe zone (e.g., and there may be no expected danger to the protected areas 315). This region within the impact limit lines 310 may be referred to herein as a safe window and a region outside the impact limit lines 310 may be referred to herein as a region to be protected.

A dashed line of FIG. 3 may illustrate a non-nominal flight path 320 that the vehicle may be following. Along this non-nominal flight path 320, the projected flight path goes beyond the impact limit lines 310. As a result, the flight should be terminated. In a conventional flight termination system, a current destruct line may be defined such that if the vehicle flies beyond the current destruct line, there will be danger to the protected areas 315. Thus, a flight control officer must make a decision and cause the flight to be terminated by the termination point 330 where the non-nominal flight path 320 intersects the current destruct line 325.

Embodiments of the present disclosure include apparatuses and methods for determining flight characteristics of a vehicle and making autonomous flight termination decisions on board the vehicle. An AFSS removes the man-in-the-loop decision and performs an autonomous process to make a flight termination decision and terminate the flight. The AFSS can continuously calculate the vehicle's instantaneous impact point using input from its on board navigation sensors. As a result, margins for the destruct lines can be less conservative, hence allowing for more flexibility in path planning in critical areas. An AFSS destruct line 335 illustrates that a decision to terminate the flight, which is made by the AFSS itself, can be delayed to a later termination point 340 where the non-nominal flight path 320 intersects the AFSS destruct line 335.

With the AFSS on board, the destruct decision is moved to the launch vehicle with telemetry transmission to the ground only needed to provide information for processing post-flight in the event of a vehicle destruct. The AFSS is responsible for either destroying or rendering a flight vehicle non-propulsive when on board logic determines the vehicle is flying outside predetermined safety limits based on predetermined flight rules for a specific vehicle and mission.

The average response for such man-in-the-loop systems may be on the order of two to three seconds, while an AFSS could respond much faster (e.g., approximately 500 milliseconds or less). Moreover, a 500-millisecond decision time may be based on a number of times through a decision cycle performed by the AFSS to validate a hazardous condition prior to deciding on termination and the amount of data required to telemeter out for post-flight analysis prior to executing a termination decision. While the 500-millisecond decision time assumes a typical decision cycle of 100 milliseconds, through tailoring of the instantaneous impact point calculation process (rules processed, boundary points, etc.), number of sensors, and the telemetry out stream, faster decision cycles can be achieved to meet niche application needs that require even faster response time (e.g., gun launched guided projectiles that can leave the barrel at several kilometers/second).

In addition to being faster and allowing a longer flight time before a termination decision is made, the AFSS also can be more cost effective than man-in-the-loop solutions and more generic to many different types of vehicles relative to conventional systems, and thus can be easily configured to meet the needs of future flight testing of a range of vehicle applications and configurations without significant modification.

Figure 4:
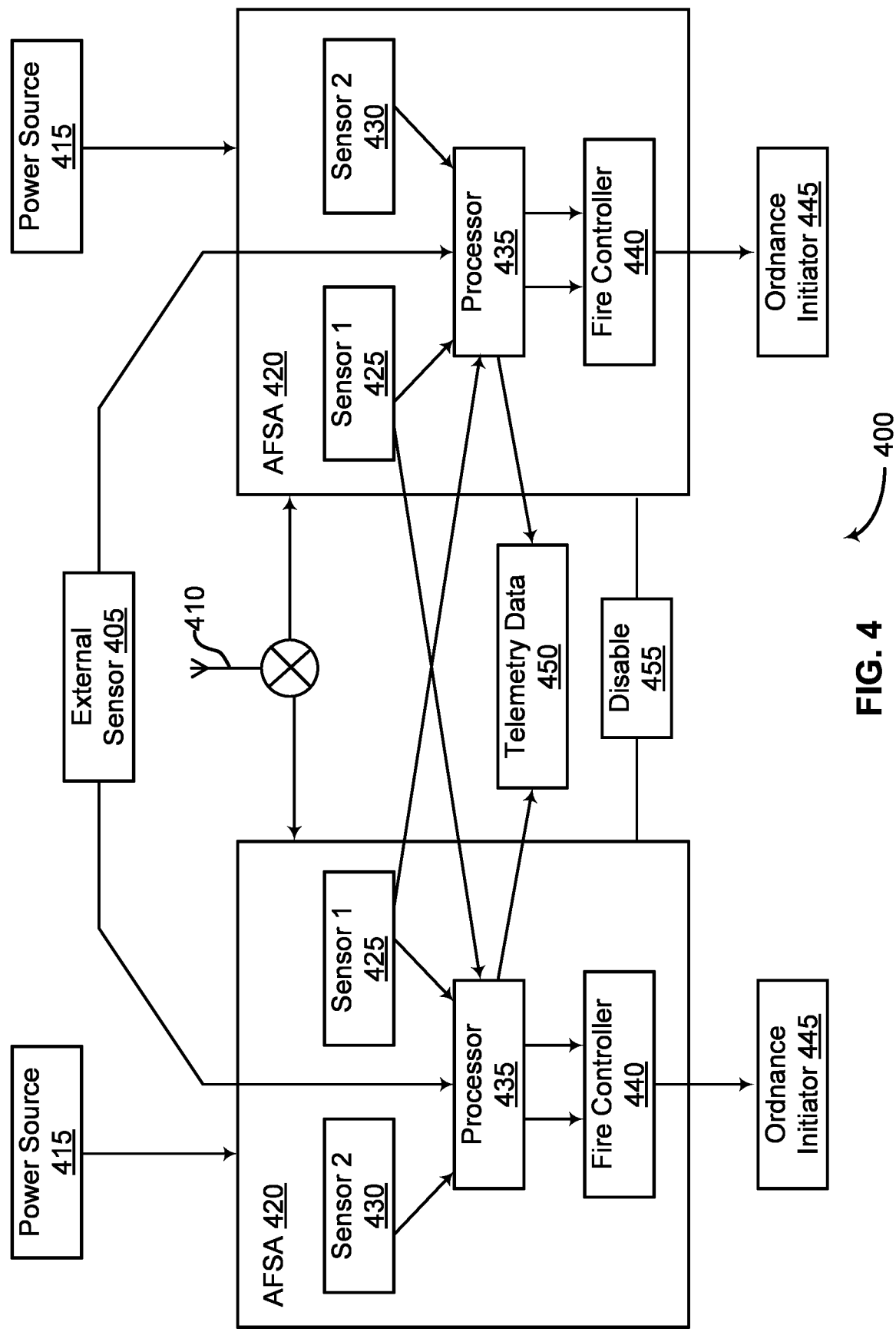
FIGS. 4 through 6 show examples of a flight safety system diagram according to aspects of the present disclosure.

FIG. 4 shows an example of a flight safety system diagram according to aspects of the present disclosure. The example shown includes AFSS 400, external sensor 405, GPS receiver 410, power source 415, AFSA 420, first sensor 425, second sensor 430, processor 435, fire controller 440, ordnance initiator 445, telemetry data 450, and common disable signal 455.

FIG. 4 illustrates a high-level functional block diagram of a flight safety system (e.g., an AFSS 400). The autonomous flight safety system may include two autonomous flight safety assemblies (AFSAs 420) that operate in a substantially independent manner. Each AFSA 420 includes a first sensor, a second sensor 430, a processor 435, and a fire controller 440.

A GPS receiver 410 may feed both autonomous flight safety assemblies and may couple to one or more of the first sensor and the second sensor 430. A common disable signal 455 may be supplied to both flight safety assemblies. Telemetry data 450 may be provided between each of the flight safety assemblies and other electronics on board the vehicle (e.g., as described in more detail herein, for example, with reference to FIG. 2). In some embodiments, each AFSA 420 may couple to a separate power source 415.

An external sensor 405 may be included and provide sensor information related to flight of the vehicle to each of the flight safety assemblies. Additionally, or alternatively, the first sensor from each AFSA 420 may be cross strapped to the other AFSA 420. Thus, the processor 435 may have access to flight information from at least two independent sources and as many as four independent sources. In one embodiment the processor 435 has access to its own first sensor, its own second sensor 430, and the first sensor from the other flight safety assembly.

The software may be configured to evaluate the mission rules against each active sensor input (e.g., three sensors) to determine if a rule requires an action (e.g., safe or terminate) to occur. Decision logic evaluates each sensor source independently and may include an incrementing stair-step function. Once the stair step function reaches a predetermined threshold, an onboard flight termination indicator may be asserted for each active sensor that reaches the threshold. If half or more of the active sensors indicate a terminate status, the fire controller 440 will generate an onboard flight termination signal to an ordnance initiator 445. After sending an onboard flight termination signal (e.g., a FireEnable command) the flight safety assembly will reevaluate the sensor inputs to verify the terminate majority vote. If that verification is successful, the flight safety assembly will complete the termination sequence by sending a Fire command.

As a non-limiting example, either flight safety assembly unit can terminate the flight based on voting three independent instantaneous impact points, each calculated from its related sensor inputs. This approach increases mission assurance and ensures that the loss of either first sensor data or second sensor 430 data does not result in an auto terminate decision.

Interfacing to the vehicle control and guidance system optional, making the embodiments more universally applicable. If vehicle guidance integration is desired, it can provide either a navigation solution and/or include a vehicle operational status signal from the guidance computer. It should be noted, however, that decisions made based on tracking source input or other signals that are interfaced to the vehicle may need to be carefully evaluated and properly weighted in the face of similar inputs from very independent sources.

Additional sensors could be added for mission assurance. Thus, the architecture is scalable to allow more redundancy for increased reliability and safety for manned missions. The decision architecture is shown to be configured with one processor 435 in a redundant set of units, each independent of the other. The architecture can also be expanded to include redundant processors 435 (more than one) to allow for increased mission assurance and dual fault tolerance requirements of manned space missions. The device is configurable to accept an external input as an additional piece of information to provide the ability to detect events from the launch system.

A processor 435 is an intelligent hardware device, (e.g., a general-purpose processing component, a digital signal processor 435 (DSP), a central processing unit (CPU), a graphics processing unit (GPU), a microcontroller, an application specific integrated circuit (ASIC), a field programmable gate array (FPGA), a programmable logic device (PLD), a discrete gate or transistor logic component, a discrete hardware component, or any combination thereof). In some cases, the processor 435 is configured to operate a memory array using a memory controller. In other cases, a memory controller is integrated into the processor 435. In some cases, the processor 435 is configured to execute computer-readable instructions stored in a memory to perform various functions. In some embodiments, a processor 435 includes special purpose components for modem processing, baseband processing, digital signal processing, or transmission processing.

Examples of a memory device include random access memory (RAM), read-only memory (ROM), or a hard disk.

Examples of memory devices include solid state memory and a hard disk drive. In some examples, memory is used to store computer-readable, computer-executable software including instructions that, when executed, cause a processor 435 to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

External sensor 405 is an example of, or includes aspects of, the corresponding element described with reference to FIG. 5. GPS receiver 410 is an example of, or includes aspects of, the corresponding element described with reference to FIGS. 1, and 5-8. AFSA 420 is an example of, or includes aspects of, the corresponding element described with reference to FIG. 5. Second sensor 430 is an example of, or includes aspects of, the corresponding element described with reference to FIG. 5. Telemetry data 450 is an example of, or includes aspects of, the corresponding element described with reference to FIG. 2.

Figure 5:
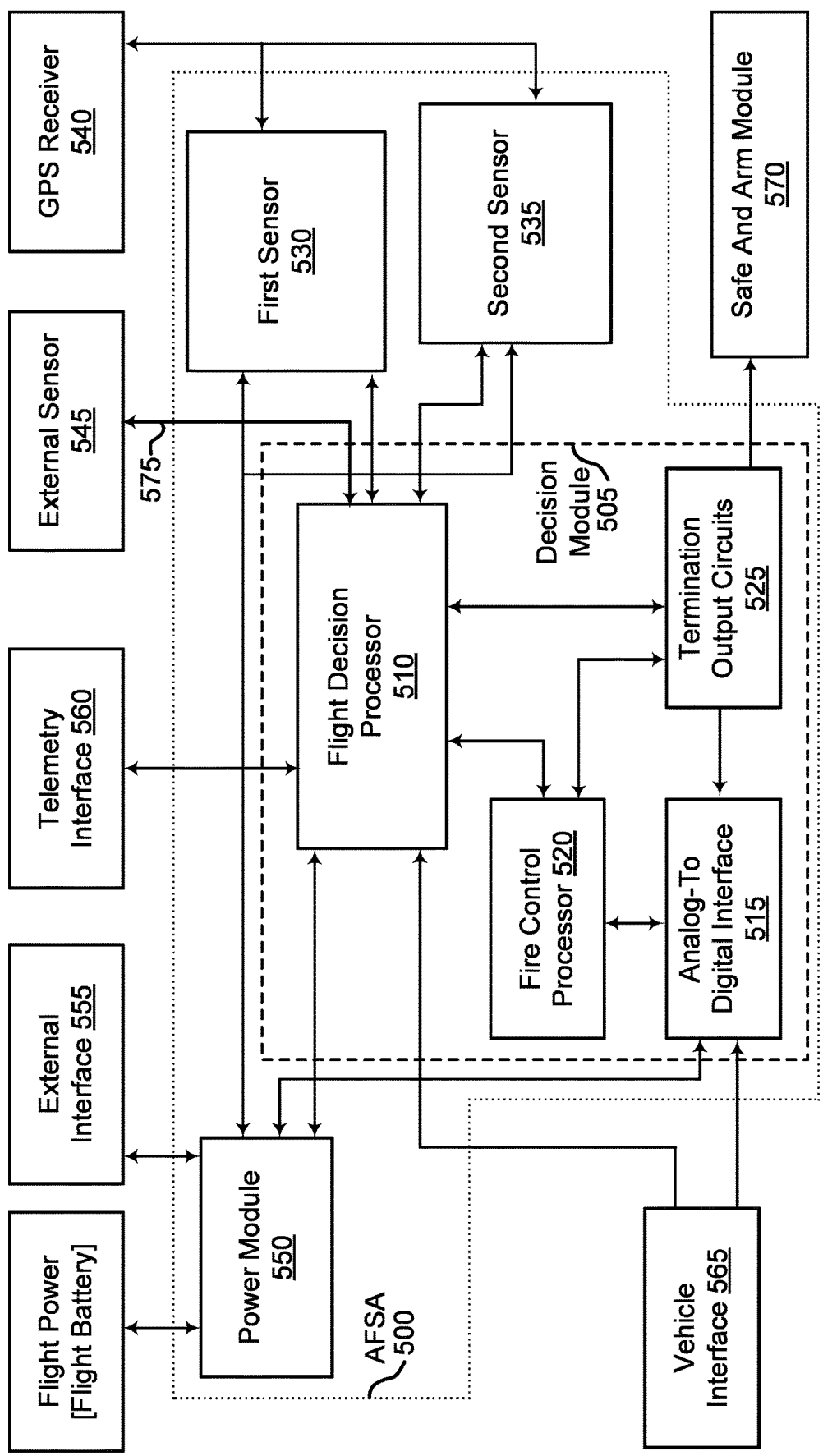

FIG. 5 shows an example of a flight safety system diagram according to aspects of the present disclosure. The example shown includes AFSA 500, decision module 505, flight decision processor 510, analog-to digital interface 515, fire control processor 520, termination output circuits 525, first sensor 530, second sensor 535, GPS receiver 540, external sensor 545, power module 550, external interface 555, telemetry interface 560, vehicle interface 565, safe and arm module 570, and sensor input 575.

FIG. 5 illustrates a detailed functional block diagram of an AFSA 500. A power module 550 provides power to the various devices of the AFSA 500 such as a decision module 505, a first sensor 530, a second sensor 535, and a safe and arm module 570. The power module 550 may also be configured to monitor power status within the AFSA 500. During flight, the power module 550 may receive power from a flight battery. An external interface 555 may supply power to the AFSA 500 prior to flight of the vehicle and may be configured to include a sensor to indicate whether external power is connected (e.g., through an umbilical connection), which can indicate that the AFSA 500 has entered a flight mode when the umbilical is disconnected.

Transfer of power between the flight battery and the external interface 555 may be controlled by a ground command from the external interface 555, a vehicle interface 565, or a telemetry interface 560. Transfer of power between the flight battery and the external interface 555 may be accomplished by a switch and diode or gate that allows battery power to be applied, but not used until the ground power (i.e., power from the external interface 555) is removed. This capability provides a convenient method of transferring power without its interruption during the transfer. The circuit also provides protection for reverse polarity and prevents ground power from damaging the batteries by blocking ground current from entering the batteries' circuit. The opposite is also true, i.e., blocking battery current from flowing into the ground power system.

The power module 550 then regulates and distributes power to the other devices in the AFSA 500. A vehicle interface 565 may be included to supply signals to the AFSA 500 while the vehicle is still on the ground. As a non-limiting example, the vehicle interface 565 may include four analog channels to an analog-to-digital interface and a digital channel to a decision processor. Thus, the vehicle interface 565 may be used to monitor function of various sensors and operations of other devices on the AFSA 500.

The telemetry interface 560 may be included to move data between a telemetry system on the vehicle and the AFSA 500. Thus, information about the health and flight status of the vehicle may be available to the AFSA 500 for processing. Moreover, in some embodiments, the telemetry interface 560 may include additional flight sensor data such as Position, Velocity, and Time (PVT) from other sensors on board the vehicle. As non-limiting examples, the telemetry interface 560 may be a serial interface such as Ethernet or an RS-422 interface. In one embodiment, three independent sensors can be interfaced to the decision module 505 and each may take the form of a GPS receiver 540, an IMU sensor, or a combination thereof. These sensors provide redundancy and can be interfaced to the decision module 505 for tracking flight position. As a non-limiting example, the sensor data may provide PVT-type information to the decision module 505.

In other embodiments, the information from the sensors may be in a more raw format and the raw information may be processed by the flight decision processor 510 to determine PVT type information. (Position sensor 3 is one example of an external sensor 545 that is external to the AFSA 500.) In some embodiments, the external sensor 545 is coupled to a sensor input 575. Further, in some embodiments, the external sensor 545 may be coupled to a stand-alone sensor. In other embodiments, the external sensor 545 may be a sensor that is part of the vehicle, but has an output that can supply PVT type information to the AFSA 500 through the sensor input 575. In other embodiments, the sensor input 575 may be connected to a sensor output of another AFSA 500 on board the vehicle. As non-limiting examples, the sensor input 575 and the sensor output may be configured as a RS-232, RS-485/422 interface.

A GPS receiver 540 may be configured for reception in the L1 and L2 bands and may include a signal amplifier to supply GPS information to a first sensor 530 and a second sensor 535. A first sensor 530 (may also be referred to herein as position sensor 1) is included within the AFSA 500 and couples to a flight decision processor 510 on the decision module 505. As a non-limiting example shown in FIG. 5, the first sensor 530 may be configured to include a GPS element to determine and provide substantially real-time position information of the AFSA 500 (and the vehicle when the AFSA 500 is attached to the vehicle) using the GPS satellite system. The first sensor 530 may also include an IMU to provide another sensor path that can sense inertial parameters responsive to motion of the vehicle. In some embodiments, a processor may be included in the first sensor 530 to gather and condition the sensor information from the GPS sensor and the IMU sensor prior to sending the information (e.g., PVT-type information) to the flight decision processor 510. The processor in the first sensor 530 may perform functions such as, for example, self-tests, software timeline management, filtering (e.g., Kalman filtering), position solution processing, GPS aiding, and communication. In some embodiments, the processor in the first sensor 530 may include a test input and may be reprogrammable through the test input.

A second sensor 535 (may also be referred to herein as position sensor 2) is included within the AFSA 500 and couples to the flight decision processor 510. As a non-limiting example shown in FIG. 5, the second sensor 535 may be configured to include a GPS element to determine and provide substantially real-time position information of the AFSA 500 (and the vehicle when the AFSA 500 is attached to the vehicle) using the GPS satellite system.

As a non-limiting example, each of the GPS elements in the first sensor 530 and the second sensor 535 may be configured to include a self-test, Security and Anti-Spoofing Module (SASM) antijam functions, dual-band receiver control, a 10 HZ update rate, satellite acquisition functions, satellite tracking functions, and communication functions. In some embodiments, the GPS elements may be reprogrammable.

As a non-limiting example the IMU sensor may be configured to include delta-V information (i.e., translational information), delta-theta information (i.e., rotational information) on three independent axes to provide six-degree-of-freedom type information. The IMU sensor may include analog-to-digital conversion, time stamping functions, a reset function, a telemetry interface 560, and a test interface.

The decision module 505 tracks the vehicle's position on the Earth and by comparison to "fly/no fly" rules, decides whether the vehicle presents a safety hazard. If the vehicle is deemed a hazard, the decision module 505 may initiate flight termination. The flight decision processor 510 accepts regulated power from the power module 550, accepts Earth position data through the GPS and INS ports (i.e., the first sensor 530, the second sensor 535, and the sensor input 575), monitors performance data from a fire control processor 520 outputs flight status and accepts uploaded ground commands when connected to an external interface 555. The flight decision processor 510 may also be configured to make the flight termination decisions based on information uploaded prior to the mission, and may continually report system status to the ground via the telemetry interface 560.

The flight decision processor 510 may include a self-test and system built-in test function to perform internal testing of the flight decision processor 510, the fire control processor 520, memory (not shown), and status of other hardware within the system. The self-test may include functions such as, for example, checking the processors and executable software by performing operations that verify correct operation. These operations may include computing a Cyclic Redundancy Check (CRC) of the executable image and performing arithmetic operations while verifying that the correct values are returned for each operation. In addition, a status request may be sent to the fire control processor 520 to verify its state and that it is communicating properly.

The flight decision processor 510 may include system performance monitoring to continually monitor system power and functional performance of the hardware while in flight. This monitoring may include functions to monitor the power system voltage levels and other functional measurements that may be important to proper operation of the AFSA 500. A mission data management function may accept and act upon mission data downloaded for the specific mission to be performed. A reprogramming function enables reprogramming with new mission rules as well as new software with future enhancements as they develop. A calculation function calculates the real-time instantaneous impact point based on data collected during flight. A rules monitoring function applies rules as dictated by the Mission Data Load (MDL) and determines any violations. A centralized communication function handles data input from all the system interfaces such as, the fire control processor 520, the first sensor 530, the second sensor 535, and the external (ground) interface.

A telemetry function may output a telemetry data stream to a vehicle telemetry module (not shown) through the telemetry interface 560 and may contain built-in-test information, flight and termination status, and information to be sent to the ground prior to termination in the event termination is initiated by a termination rule. A flight termination system (FTS) function may control commands for arming, safing, and firing of an external termination mechanism in combination with the fire control processor 520. A termination decision function initiates the vehicle flight termination should a rule violation indicate that the vehicle flight has become hazardous to the public.

The fire control processor 520 controls safety for the system including arming, monitoring of flight environments, initiating flight termination, and/or rendering the system safe under the commands of the flight decision processor 510. The fire control processor 520 includes safety inhibits for the arm and fire signals. A self-test function may be included for internal testing of the fire control processor 520 and other hardware such as termination output circuits for proper functionality similar to the decision module 505 self-test. A system performance monitoring function includes continual monitoring of all system power and arm and fire status of the fire control processor 520.

The termination output circuits may control generation of one or more termination signals responsive to inputs from the flight decision processor 510 and the fire control processor 520. For example, one output may be about a 7.5 amp output that is asserted for about 200 milliseconds to a safe and arm device. Two other outputs may be configured as about 200 milliamps that can be asserted at different times to trigger different events. For example, one output may provide a signal to shut down rocket motors or control an enable switch to the safe and arm device. These outputs may be programmed for various uses depending on what type of vehicle the AFSA 500 is installed on.

The embodiment of FIG. 5 illustrates a fire control processor 520 and a flight decision processor 510. These processors may be any suitable type of microprocessor, microcontroller, custom logic, or combinations thereof. In addition, some embodiments may be configured using a single processor to perform the fire control processes and the flight decision processes.

In the example of FIG. 5, flight decision processor 510 may include or implement self-test and system BIT, system performance monitoring, mission data management, reprogramming, Impact point (I/P) calculation, rules monitoring, centralized communication, telemetry, FTS control, termination decisions, etc. Analog-to-digital interface 515 may include or implement voltage/current monitoring, battery status monitoring, arm & fire status monitoring, vehicle inputs, etc. Fire control processor 520 may include or implement self-testing, system safety, command arm, launch indicator processing, communications, fire signal output connection, etc. Termination output circuits 525 may include or implement safety monitoring, arm control, 2-200 mA output signals, 1-7.5 A output signals, etc.

In the example of FIG. 5, vehicle interface 565 may include or implement vehicle electronics (e.g., which may include or process discrete digital data, discrete analog data, etc.). Power module 550 may include or implement power distribution, power monitor signals, and external interface. First sensor 530 may, for example, include or implement a processor, a GPS receiver, IMU electronics, etc. Second sensor 535 may, for example, include or implement a GPS receiver, etc.

AFSA 500 is an example of, or includes aspects of, the corresponding element described with reference to FIG. 4. Second sensor 535 is an example of, or includes aspects of, the corresponding element described with reference to FIG.

4. GPS receiver 540 is an example of, or includes aspects of, the corresponding element described with reference to FIGS. 1, 4, and 6-8. External sensor 545 is an example of, or includes aspects of, the corresponding element described with reference to FIG. 4.

Figure 6:
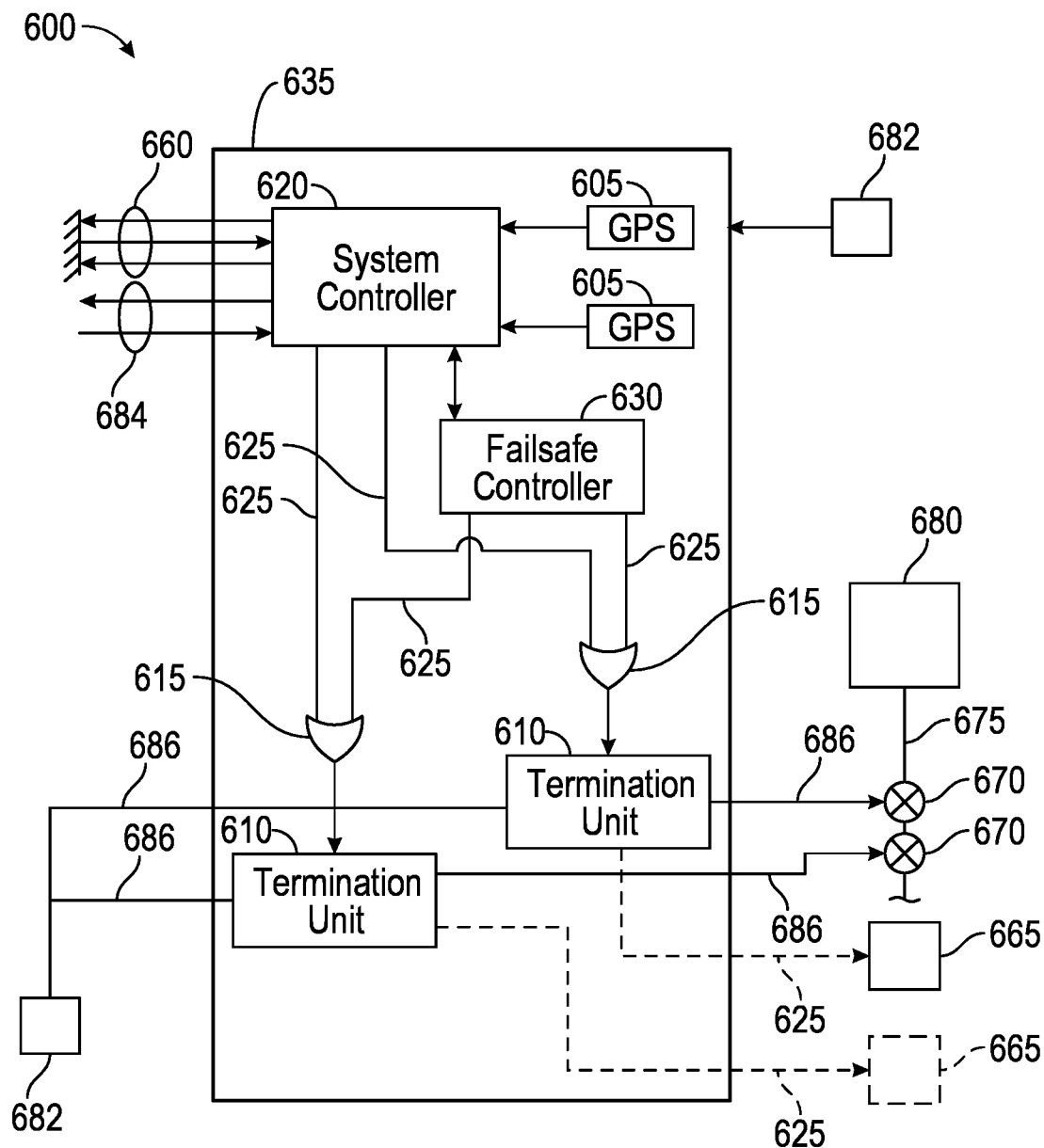

FIG. 6 shows an example of a flight safety system diagram according to aspects of the present disclosure. The example shown includes flight termination system 600, GPS receiver 605, termination units 610, logic gates 615, system controller 620, connections 625, failsafe controller 630, avionics box 635, explosives 665, valves 670, fuel supply line 675, engine 680, sources 682, telemetry connections 684, and lines 686.

FIG. 6 illustrates a schematic representation of an example autonomous flight termination system 600. In some examples, a flight termination system 600 (e.g., an autonomous flight termination system 600) may terminate a vehicle flight after a vehicle is launched (e.g., from an aircraft). The flight termination system 600 may include a GPS receiver 605, a vehicle flight termination unit 610, a system controller 620, and a failsafe controller 630. In some examples, the flight termination system 600 may be mounted on board a vehicle.

The GPS receiver 605 may be configured to determine a position of the vehicle during vehicle flight relative to the Earth. The GPS receiver 605 may provide position data continuously to the system controller 620 during flight of the vehicle, which is used by the system controller 620 to calculate the actual vehicle flight trajectory. In an embodiment, the system may include a second GPS receiver 605, which may be mounted on a circuit card in avionics box 635, which may also provide position data to the system controller 620. GPS receiver 605 is an example of, or includes aspects of, the corresponding element described with reference to FIGS. 1, 4, 5, 7, and 8.

The system controller 620 may be connected via hardline separation switches or a link 660, which in an embodiment may take the form of a MIL-STD interface as part of an umbilical. The system controller 620, which may be configured to receive a signal indicative of position data from GPS receivers 605 to calculate an actual vehicle trajectory relative to the Earth, also may include a stored, predetermined mission-planned flight trajectory (e.g., a planned flight envelope) having predetermined safety limits or safety bounds for the vehicle.

The system optionally may include a redundant or second termination unit 610 in addition to first termination unit 610. Termination units 610 may be connected to receive termination signals from the system controller 620 over signal paths or connections 625. In some examples, the termination units 610 each may include, or consist of, a normally open cut-off switch connected to terminate the vehicle flight when actuated, and/or a normally open switch connected to detonate an explosive mounted on the vehicle, which may be selected to destroy all of the vehicle, or a portion of the vehicle, or first stage booster essential for continued flight. The system controller 620 may be connected to the termination units 610 to send a third signal to actuate the termination units 610 to terminate the flight of the vehicle when the actual vehicle trajectory is determined by the system controller 620 to be outside the safety bounds of the mission-planned flight trajectory for the vehicle.

In embodiments, the cut-off switches of the termination units 610 may take the form of normally open relays such that a loss of power to the system from flight termination power source causes the relays to open and create a terminate condition. In an embodiment, the cut-off switches of the termination units 610 may be connected to normally closed valves 670, respectively, mounted in series on a fuel supply line 675 connected to the power plant or engine 680 of the vehicle. In an embodiment, the engine 680 may take the form of a booster for the first stage of the vehicle. In an embodiment, the system controller 620 may be connected to the cut-off switches of the termination units 610 so that actuation of the termination units 610 by the third signal may include de-energizing the cut-off switches to their normally open states, which in turn closes the valves 670 to shut off fuel flow through fuel line to engine 680.

The termination units 610 which may receive electrical power from a flight termination battery or other source of electric power on board the vehicle, may energize the normally open cut-off switches to closed positions, which may allow the valves 670 to be energized by vehicle battery or other power source to open configurations beginning at vehicle launch. The valves 670 remain energized, and thereby open, by vehicle battery continuously during flight of the vehicle, or in embodiments, during burn of the first stage booster. In an embodiment, the valves 670 may receive electrical power from vehicle battery over electrical power lines 686 and through termination units 610, respectively, and energize and maintain the valves 670 to their open positions and thereby permit fuel flow through supply to engine 680 continuously during flight of the vehicle along the mission-planned trajectory, or during burn of the first stage booster.

In the event that electric power from sources 682 fails or is purposely removed, or one or both termination units 610 is de-energized by system controller 620 or failsafe controller 630, causing the cut-off switches of the termination units 610 to open, thereby cutting electric current to the valves 670, causing them to close. This shuts off fuel flow through fuel line to the engine 680 and terminates the flight of vehicle or first stage. The system controller 620 may actuate (i.e., open) the cut-off switches of the termination units 610 to de-energize the valves 670, respectively, in the event that the system controller 620 determines the actual flight trajectory to be outside the safety bounds of the mission-planned flight trajectory of the vehicle. Either or both of the valves 670, when closed, stops the flow of fuel through fuel supply line 675 and thereby starves the engine 680 of fuel, causing the vehicle to lose altitude and crash into a predetermined safe area, such as an unpopulated land area or an unoccupied expanse of ocean.

The failsafe controller 630 of the system may be connected to the system controller 620 to receive operational data of the system controller 620. The failsafe controller 630 may be connected to the termination unit 610 by signal path or connection, and in embodiments to the redundant termination unit 610, by signal path or connection. In an embodiment, the signal paths or connections 625 from system controller 620 and failsafe controller 630, respectively, may be connected to the input of an OR logic gate 615 that is connected to, or incorporated in, the normally open cut-off switch and/or normally open switch of termination unit 610. Similarly, the signal paths or connections 625 from system controller 620 and failsafe controller 630, respectively, may be connected to the input of an OR logic gate 615 that is connected to, or incorporated in, the normally open cut-off switch of termination unit 610.

The failsafe controller 630 may send a signal to the termination units 610 to actuate (i.e., de-energize) their respective cut-off switches to their normally open positions, thereby cutting electric power to valves 670, which closes the valves 670 to cut fuel flow to the engine 680, thus terminating vehicle flight when the operational data received from the system controller 620 indicates that the system controller 620 is in an error state. The termination units 610 may be connected through OR logic gates 615 to the system controller 620 and failsafe controller 630 so that a termination signal received from either the system controller 620 or the addition, termination unit 610 may be connected to an arm/fire explosive device by signal path or connection 625, and termination unit 610 may be connected to an optional arm/fire explosive device 665 by signal path or connection. The switches of termination units 610 may be normally open switches connected to or incorporating the OR logic gates 615. The system may abruptly terminate flight of the vehicle, or of booster stage, by actuating switches contained in one or both of the termination units 610 to break electric current from lines 686 that detonate one or both explosives 665 mounted on the vehicle that destroys all or a portion of the vehicle essential to flight, such as the booster stage.

In embodiments, the error state detected by the failsafe controller 630 may include one or more of a clock failure in the system controller 620, a loss of power to the system and therefore to the system controller 620, a system controller 620 hardware failure, and a system controller 620 software failure. In other embodiments, the error state may include one of the foregoing, all of the foregoing, or a subset of one or more of the foregoing.

In still other embodiments, the failsafe controller 630 may consist of, or include, a "watchdog" function that may take the form of a software watchdog timer. That is, the failsafe controller 630 may include a time-out clock that must be periodically reset by a signal from the system controller 620. In the event that the system controller 620 does not reset the time-out clock of the failsafe controller 630, the failsafe controller 630 will send a termination signal to the termination unit 610, thereby actuating the termination units 610 to terminate the flight of the vehicle by closing valves 670 and/or detonating explosive. In embodiments, the watchdog function of the failsafe controller 630 is that of a software watchdog timer.

Figure 7:
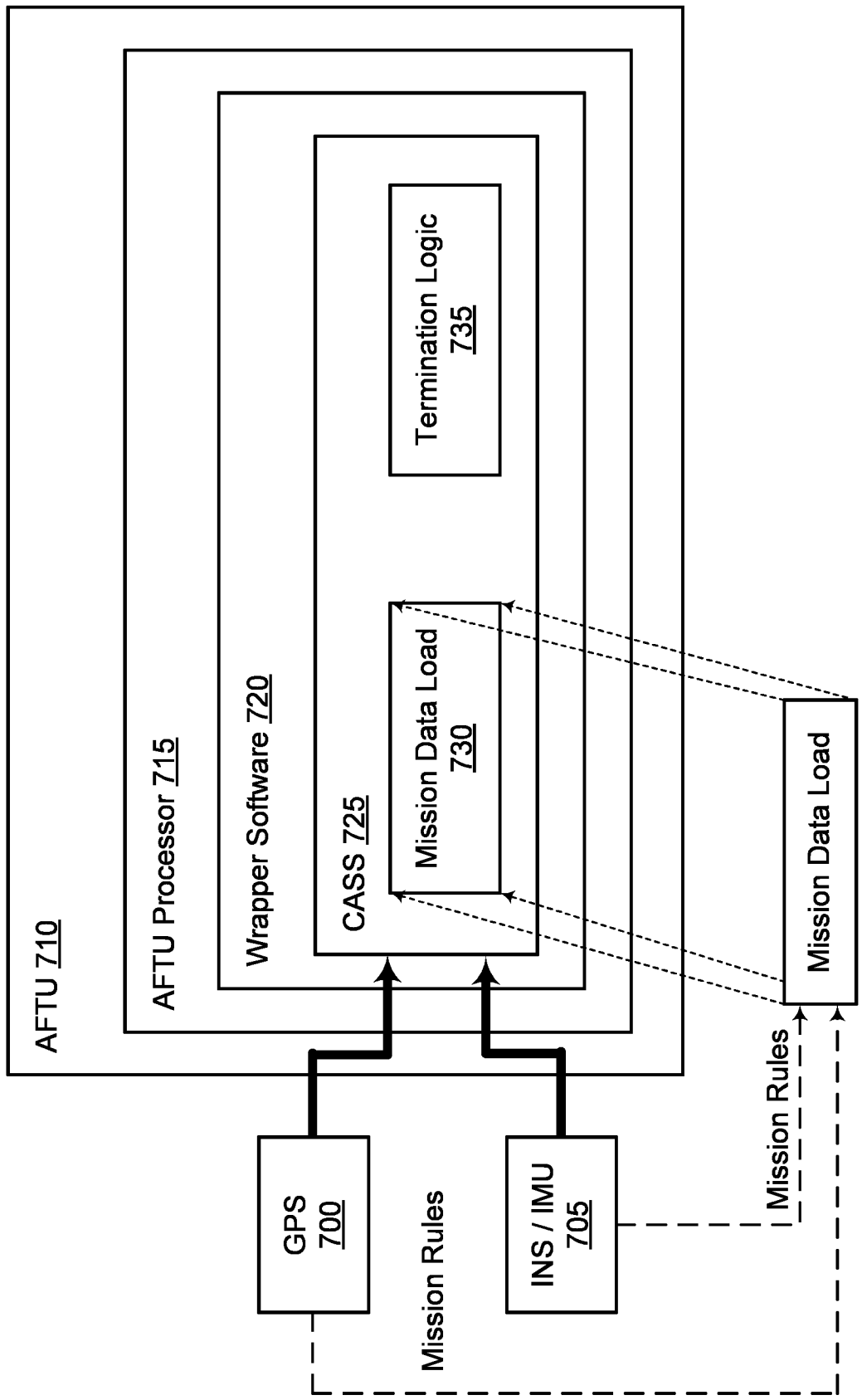
FIG. 7 shows an example of a top level block diagram of an autonomous flight termination unit (AFTU) according to aspects of the present disclosure.

FIG. 7 shows an example of a top level block diagram of an AFTU according to aspects of the present disclosure. The example shown includes GPS receiver 700, INS 705, and AFTU 710.

In some examples, FIG. 7 illustrates an example top level block diagram of an AFTU 710 according to one or more aspects of the present disclosure. In some examples, an AFTU 710 may be included as a fly-away component of an AFSS executing a mission (e.g., a MDL file may describe a planned flight envelope set by, for example, a mission planning team). The AFTU 710 may provide on-board range safety by independently monitoring vehicle dynamics to destruct a missile system (e.g., terminate a launch vehicle) if certain termination conditions are observed. In some examples, the position of the vehicle is monitored and compared to a mission profile (e.g., a MDL file) to verify the vehicle is within limited bounds (e.g., safe operation bounds).

As described herein, additional modes of failure may also be monitored by an AFTU 710. For instance, each AFTU 710 may provide an independent sensor (e.g., such as an independent microelectromechanical system (MEMS) based 3-axis gyro) to monitor vehicle body rates which enhances missile system monitoring through the planned flight envelope. The body rates may be fed to some instability detection processing (e.g., such as a BID algorithm developed by GA-EMS to execute within each AFTU 710). An AFTU 710 described herein may offer an enhanced capability (e.g., such as instability detection monitoring, launch vehicle termination, etc.) to detect and decisively respond to failure scenarios that occur too rapidly for response times of typical flight termination system approaches.

For example, for boundary limit detection, an AFTU 710 may monitor a vehicle's PVT state relative to criteria (e.g., boundaries, protected areas, etc.) described in rules included in an MDL file. Devices external to the AFTU 710 (e.g., such as a GPS receiver 700, INS 705, IMU, or other devices or sensors) provide raw state data to the AFTU 710. This raw data is received by the vendor-provided Wrapper Software 720 (e.g., position sensing system interface software), which in turn provides the data to the CASS 725. In some examples, the CASS 725 may be developed and certified (e.g., by range safety professionals commissioned by a governing body), and CASS 725 may then be integrated by an AFTU 710 vendor. Rules governing expected host vehicle behavior, as a function of the data from these external devices, may be encapsulated within the MDL file that is implanted within the AFTU 710 for a particular mission engagement.

GPS receiver 700 is an example of, or includes aspects of, the corresponding element described with reference to FIGS. 1, 4-6, and 8. INS 705 is an example of, or includes aspects of, the corresponding element described with reference to FIG. 1. AFTU 710 is an example of, or includes aspects of, the corresponding element described with reference to FIG. 8. In one embodiment, AFTU 710 includes AFTU processor 715, wrapper software 720, CASS 725, mission data load file 730, and termination logic 735. AFTU processor 715 is an example of, or includes aspects of, the corresponding element described with reference to FIG. 8. Position sensing system interface software 720 is an example of, or includes aspects of, the corresponding element described with reference to FIGS. 8 and 9.

According to some embodiments, AFTU 710 comprises a processor adapted to receive repeatedly a location signal indicative of a position in three-dimensional space of a launch vehicle, compare repeatedly the position indicated by the location signal with a planned flight envelope, receive repeatedly a gyro signal indicative of a pitch rate and yaw rate of the launch vehicle, compare repeatedly the pitch rate and yaw rate indicated by the gyro signal with a maximum prescribed pitch rate and yaw rate, and activate a flight termination system 600 in the event at least one termination condition selected from a group of termination conditions is detected, the group of termination conditions consisting of: the position being outside the planned flight envelope, the pitch rate and yaw rate exceeding the maximum prescribed pitch rate and yaw rate, and combinations thereof.

In some examples, the location signal is received repeatedly at a first sampling rate and the gyro signal is received repeatedly at a second sampling rate, where the second sampling rate is higher than the first sampling rate. In some examples, the location signal is received repeatedly at a first sampling rate and the gyro signal is received repeatedly at a second sampling rate, where the second sampling rate is lower than the first sampling rate. In some examples, the location signal is received repeatedly at a first sampling rate and the gyro signal is received repeatedly at a second sampling rate, where the second sampling rate is equal to the first sampling rate. In some examples, the pitch rate and yaw rate indicated by the gyro signal include a separate pitch value and a separate yaw value, and where the maximum prescribed pitch rate and yaw rate includes a separate maximum pitch value and a separate maximum yaw value.

In some examples, the comparing repeatedly the pitch rate and yaw rate indicated by the gyro signal with the maximum prescribed pitch rate and yaw rate includes comparing the separate pitch value to the separate maximum pitch value and comparing the separate yaw value to the separate maximum yaw value. In some examples, the pitch rate and yaw rate indicated by the gyro signal include a combined pitch rate and yaw rate value, and where the maximum prescribed pitch rate and yaw rate includes a combined maximum pitch rate and yaw rate value. In some examples, the comparing repeatedly the pitch rate and yaw rate indicated by the gyro signal with the maximum prescribed pitch rate and yaw rate includes comparing the combined pitch rate and yaw rate value to the combined maximum pitch rate and yaw rate value. In some examples, AFTU 710 comprises a first circuit card assembly including the processor.

In some examples, AFTU 710 comprises a second circuit card assembly including an input and an output interface circuit. In some examples, AFTU 710 comprises a third circuit card assembly including a power conditioning circuit. In some examples, AFTU 710 comprises a fourth circuit card assembly including a connector and a connector circuit. In some examples, AFTU 710 comprises a first circuit card assembly including the processor and the position sensing system. In some examples, AFTU 710 comprises a second circuit card assembly including an input and an output interface circuit. In some examples, AFTU 710 comprises a third circuit card assembly including a power conditioning circuit. In some examples, AFTU 710 comprises a fourth circuit card assembly including a connector and a connector circuit.

AFTU 710 is an example of, or includes aspects of, the corresponding element described with reference to FIGS. 7 and 8.

According to some embodiments, CASS 725 receives repeatedly a location signal indicative of a position in three-dimensional space of a launch vehicle. In some examples, CASS 725 compares repeatedly the position indicated by the location signal with a planned flight envelope. In some examples, CASS 725 compares repeatedly the pitch rate and yaw rate indicated by the gyro signal with a maximum prescribed pitch rate and yaw rate. In some examples, the location signal is received repeatedly at a first sampling rate and the gyro signal is received repeatedly at a second sampling rate, where the second sampling rate is higher than the first sampling rate. In some examples, the location signal is received repeatedly at a first sampling rate and the gyro signal is received repeatedly at a second sampling rate, where the second sampling rate is lower than the first sampling rate. In some examples, the location signal is received repeatedly at a first sampling rate and the gyro signal is received repeatedly at a second sampling rate, where the second sampling rate is equal to the first sampling rate.

According to some embodiments, the position sensing system comprises a GPS receiver 700, where the AFTU 710 is coupled to the GPS receiver 700, where the GPS receiver 700 generates the location signal, and where the position sensing system receives the location signal.

CASS 725 is an example of, or includes aspects of, the corresponding element described with reference to FIGS. 8 and 9. Mission data load file 730 is an example of, or includes aspects of, the corresponding element described with reference to FIGS. 8 and 9.

According to some embodiments, termination logic 735 activates a flight termination system in the event at least one termination condition selected from a group of termination conditions is detected, the group of termination conditions consisting of: the position being outside the planned flight envelope, the pitch rate and yaw rate exceeding the maximum prescribed pitch rate and yaw rate, and combinations thereof.

Termination logic 735 is an example of, or includes aspects of, the corresponding element described with reference to FIG. 8.

Figure 8:
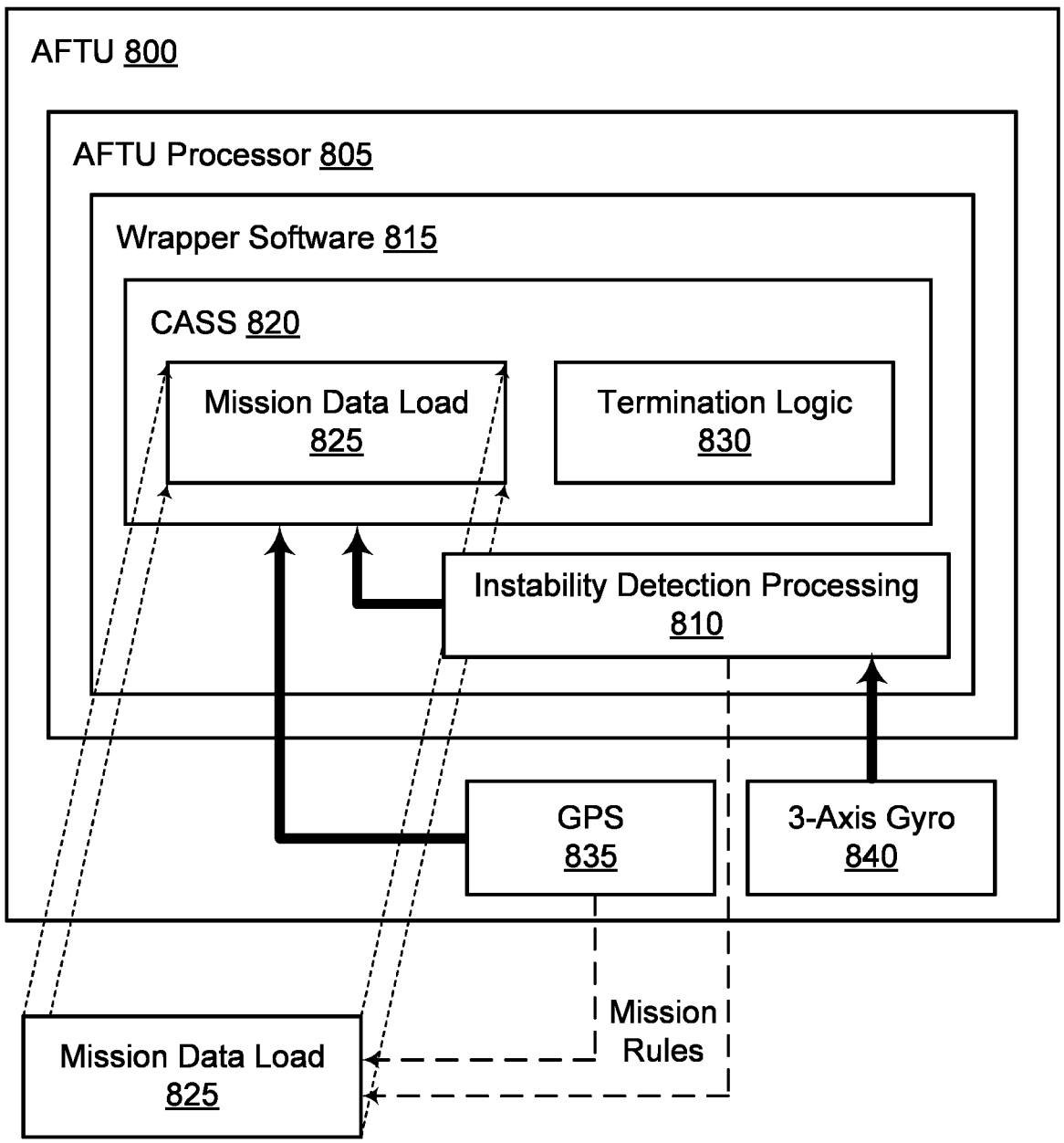
FIG. 8 shows an example of a top level block diagram of an AFTU according to aspects of the present disclosure.

FIG. 8 shows an example of a top level block diagram of an AFTU according to aspects of the present disclosure. FIG. 8 illustrates an example top level block diagram of an AFTU 800 according to one or more aspects of the present disclosure. In some examples, an AFTU 800 may include optional integration of a GPS receiver 835 (e.g., a third party GPS receiver 835) internal to the AFTU 800, in addition to any external devices. Such may allow for determination of a vehicle's PVT state, without external GPS support. Rules governing safe trajectory as a function of location information data (e.g., such as PVT state) is implanted within the MDL file, and the raw location information data itself is provided to the CASS 820. While this PVT state information is sufficient to determine whether or not the vehicle has crossed the safe operating boundaries for its planned flight path, such data may not necessarily be conclusive for determining whether the vehicle is stable (e.g., in control).

For example, a vehicle may become unstable and tumble out of control while still maintaining a trajectory (e.g., and PVT state) within defined boundary limits described in the MDL file. Such may potentially result in a catastrophic failure scenario in which a vehicle becomes rotationally unstable without leaving its nominal flight path boundary volume and triggering timely termination. The present disclosure provides an AFTU 800 that may address such scenarios via body instability detection as described herein. One or more aspects of the present disclosure may be implemented to detect vehicle instability (e.g., launch vehicle tumbling) and to subsequently issue termination commands upon detecting such termination conditions. An AFTU 800 may offer enhanced performance by increasing capabilities inherent within the AFTU 800 itself, without reliance on any external sensors, and within a rapid response timeline.

The AFTU 800 integrates an independent three-axis gyro 840 and instability detection processing 810 (e.g., a custom BID algorithm) to monitor angular rates of the vehicle (e.g., via repeatedly receiving a gyro 840 signal indicative of a pitch rate and yaw rate of the launch vehicle), determine if the vehicle is no longer under stable control, and issue automatic termination under such conditions. The AFTU 800 may perform such operations while adhering to a structure of the CASS 820 framework. Output of the instability detection processing 810 may be provided to the CASS 820 as sensor input (e.g., via user-definable features provided by the CASS 820). Termination conditions as a function of instability detection processing 810 (e.g., BID) output parameters may be defined within the MDL file (e.g., as with other sensors). CASS 820 may issue any termination decisions based on the MDL file. Use of the integral three-axis gyro 840 and associated processing within the AFTU 800 itself may provide a fully integrated, robust, and truly autonomous safety solution.

Beyond including the sensing devices within the size, weight, and volume of the size reduced AFTU 800 for a single integrated system, one or more aspects of the present disclosure also enable the possibility for the instability detection processing 810 (e.g., a BID algorithm suite) to ingest gyro 840 sampling rates higher than a CASS 820 update rate. One or more aspects of the present disclosure also provide filtering, threshold detection, and verification depending on the implementation of a AFSS. Further, the present disclosure describes and enables one or more reliable, robust indications of stability or instability as output for use in the MDL.

AFTU 800 is an example of, or includes aspects of, the corresponding element described with reference to FIG. 7. In one embodiment, AFTU 800 includes AFTU processor 805, wrapper software 815, CASS 820, mission data load file 825, termination logic 830, GPS receiver 835, and gyro 840. AFTU processor 805 is an example of, or includes aspects of, the corresponding element described with reference to FIG. 7. In one embodiment, AFTU processor 805 includes instability detection processing 810.

According to some embodiments, instability detection processing 810 receives repeatedly a gyro 840 signal indicative of a pitch rate and yaw rate of the launch vehicle. In some examples, the pitch rate and yaw rate indicated by the gyro 840 signal include a separate pitch value and a separate yaw value, and where the maximum prescribed pitch rate and yaw rate includes a separate maximum pitch value and a separate maximum yaw value. In some examples, the comparing repeatedly the pitch rate and yaw rate indicated by the gyro 840 signal with the maximum prescribed pitch rate and yaw rate includes comparing the separate pitch value to the separate maximum pitch value and comparing the separate yaw value to the separate maximum yaw value. In some examples, the pitch rate and yaw rate indicated by the gyro 840 signal include a combined pitch rate and yaw rate value, and where the maximum prescribed pitch rate and yaw rate includes a combined maximum pitch rate and yaw rate value. In some examples, the comparing repeatedly the pitch rate and yaw rate indicated by the gyro 840 signal with the maximum prescribed pitch rate and yaw rate includes comparing the combined pitch rate and yaw rate value to the combined maximum pitch rate and yaw rate value.

Instability detection processing 810 is an example of, or includes aspects of, the corresponding element described with reference to FIG. 9. Position sensing system interface software 815 is an example of, or includes aspects of, the corresponding element described with reference to FIGS. 7 and 9. CASS 820 is an example of, or includes aspects of, the corresponding element described with reference to FIGS. 7 and 9. Mission data load file 825 is an example of, or includes aspects of, the corresponding element described with reference to FIGS. 7 and 9. Termination logic 830 is an example of, or includes aspects of, the corresponding element described with reference to FIG. 7. GPS receiver 835 is an example of, or includes aspects of, the corresponding element described with reference to FIGS. 1, and 4-7. Gyro 840 is an example of, or includes aspects of, the corresponding element described with reference to FIG. 9.

Figure 9:
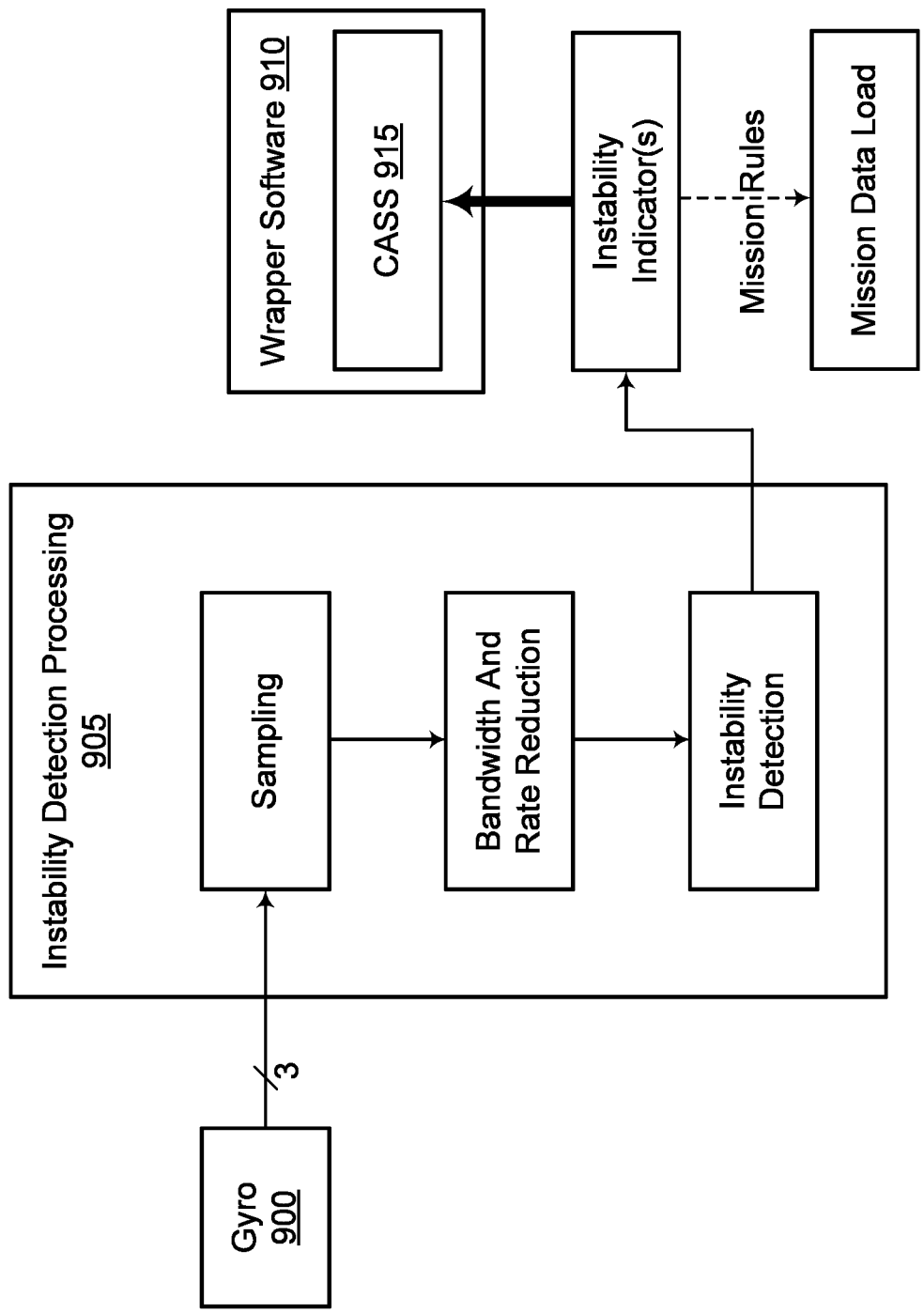
FIG. 9 shows an example of an instability detection processing diagram according to aspects of the present disclosure.

FIG. 9 shows an example of an instability detection processing diagram according to aspects of the present disclosure. The example shown includes gyro 900, instability detection processing 905, wrapper software 910, and CASS 915.

FIG. 9 illustrates an example block diagram for instability detection processing 905 (e.g., which may include or be implemented via a BID algorithm, a GA-EMS BID algorithm, instability detection processing 905 hardware, etc.) according to one or more aspects of the present disclosure. Gyros 900 providing angular rates for each of three rotational axes are sampled (e.g., via the instability detection processing 905) at a rate that may be significantly higher than the rate accommodated by CASS 915 for its sensor input. This raw sensor is sampled at the raw input rate, and may include subsequent bandwidth and rate reduction for elimination of false positives. The instability detection processing 905 may be either on a per-axis basis, or a single composite value. Finally, the instability detection processing 905 (e.g., which may include or be referred to as a BID algorithm) produces one or more output indicators accepted by the CASS 915. Such may enable rapid detection of vehicle stability or instability, and in some cases may enable automatic termination of one or more vehicle operations (e.g., such as termination of a launch vehicle by an AFTU). As such, an instable vehicle, an unsafe vehicle, a dangerously tumbling vehicle, etc. may have operations terminated even if the vehicle's PVT state remains within safe trajectory boundaries, in accordance with the criteria set by the MDL file.

Gyro 900 is an example of, or includes aspects of, the corresponding element described with reference to FIG. 8. Instability detection processing 905 is an example of, or includes aspects of, the corresponding element described with reference to FIG. 8. Position sensing system interface software 910 is an example of, or includes aspects of, the corresponding element described with reference to FIGS. 7 and 8. CASS 915 is an example of, or includes aspects of, the corresponding element described with reference to FIGS. 7 and 8.

Figure 10:
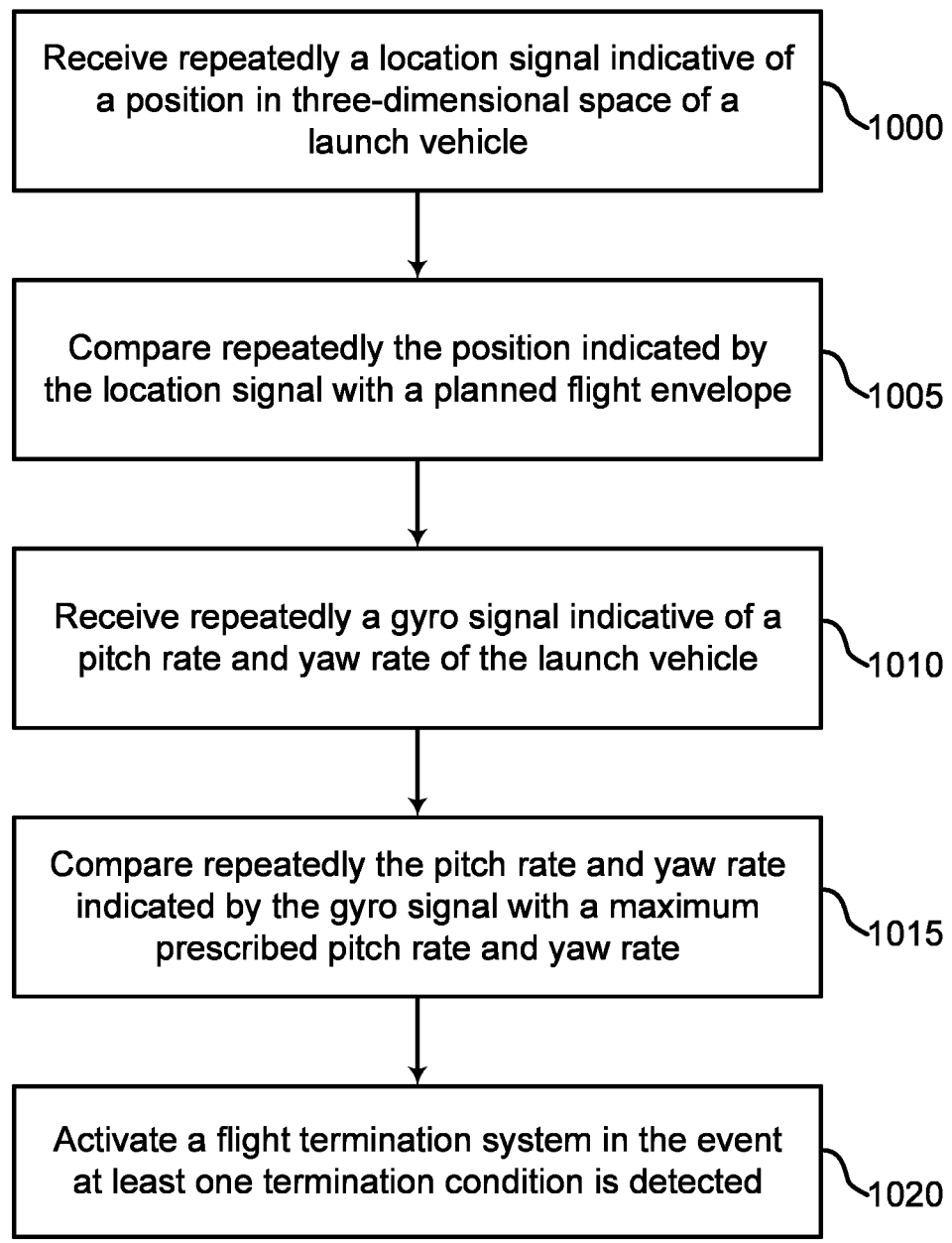
FIG. 10 shows an example of a process for autonomous flight termination according to aspects of the present disclosure.

FIG. 10 shows an example of a process for autonomous flight termination according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1000, the system receives repeatedly a location signal indicative of a position in three-dimensional space of a launch vehicle. In some cases, the operations of this step refer to, or may be performed by, CASS as described with reference to FIGS. 7-9.

At operation 1005, the system compares repeatedly the position indicated by the location signal with a planned flight envelope. In some cases, the operations of this step refer to, or may be performed by, CASS as described with reference to FIGS. 7-9.

At operation 1010, the system receives repeatedly a gyro signal indicative of a pitch rate and yaw rate of the launch vehicle. In some cases, the operations of this step refer to, or may be performed by, instability detection processing as described with reference to FIGS. 8 and 9.

At operation 1015, the system compares repeatedly the pitch rate and yaw rate indicated by the gyro signal with a maximum prescribed pitch rate and yaw rate. In some cases, the operations of this step refer to, or may be performed by, CASS as described with reference to FIGS. 7-9.

At operation 1020, the system activates a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof. In some cases, the operations of this step refer to, or may be performed by, termination logic as described with reference to FIGS. 7 and 8.

Accordingly, the present disclosure includes the following embodiments.

An apparatus for autonomous flight termination is described. One or more embodiments of the apparatus include a position sensing system, a three-axis gyro, a processor adapted to receive repeatedly a location signal indicative of a position in three-dimensional space of a launch vehicle, compare repeatedly the position indicated by the location signal with a planned flight envelope, receive repeatedly a gyro signal indicative of a pitch rate and yaw rate of the launch vehicle, compare repeatedly the pitch rate and yaw rate indicated by the gyro signal with a maximum prescribed pitch rate and yaw rate, and activate a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof, and a termination system configured to initiate a termination of the launch vehicle in response to activation of the flight termination system.

A system for autonomous flight termination, the system comprising: a position sensing system, a three-axis gyro, a processor adapted to receive repeatedly a location signal indicative of a position in three-dimensional space of a launch vehicle, compare repeatedly the position indicated by the location signal with a planned flight envelope, receive repeatedly a gyro signal indicative of a pitch rate and yaw rate of the launch vehicle, compare repeatedly the pitch rate and yaw rate indicated by the gyro signal with a maximum prescribed pitch rate and yaw rate, and activate a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof, and a termination system configured to initiate a termination of the launch vehicle in response to activation of the flight termination system.

A method of manufacturing an apparatus for autonomous flight termination is described. The method includes manufacturing a position sensing system, a three-axis gyro, a processor adapted to receive repeatedly a location signal indicative of a position in three-dimensional space of a launch vehicle, compare repeatedly the position indicated by the location signal with a planned flight envelope, receive repeatedly a gyro signal indicative of a pitch rate and yaw rate of the launch vehicle, compare repeatedly the pitch rate and yaw rate indicated by the gyro signal with a maximum prescribed pitch rate and yaw rate, and activate a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof, and a termination system configured to initiate a termination of the launch vehicle in response to activation of the flight termination system.

In some examples, the position sensing system comprises a global positioning system receiver. In some examples, the position sensing system further comprises an inertial navigation system. Some examples of the apparatus, system, and method described above further include a global positioning system receiver, wherein the autonomous flight termination unit is coupled to the global positioning system receiver, wherein the global positioning system receiver generates the location signal, and wherein the position sensing system receives the location signal.

In some examples, the location signal is received repeatedly at a first sampling rate and the gyro signal is received repeatedly at a second sampling rate, where the second sampling rate is higher than the first sampling rate. In some examples, the location signal is received repeatedly at a first sampling rate and the gyro signal is received repeatedly at a second sampling rate, where the second sampling rate is lower than the first sampling rate.

In some examples, the location signal is received repeatedly at a first sampling rate and the gyro signal is received repeatedly at a second sampling rate, where the second sampling rate is equal to the first sampling rate. In some examples, the pitch rate and yaw rate indicated by the gyro signal comprises a separate pitch value and a separate yaw value, and where the maximum prescribed pitch rate and yaw rate comprises a separate maximum pitch value and a separate maximum yaw value.

In some examples, the comparing repeatedly the pitch rate and yaw rate indicated by the gyro signal with the maximum prescribed pitch rate and yaw rate comprises comparing the separate pitch value to the separate maximum pitch value and comparing the separate yaw value to the separate maximum yaw value. In some examples, the pitch rate and yaw rate indicated by the gyro signal comprises a combined pitch rate and yaw rate value, and where the maximum prescribed pitch rate and yaw rate comprises a combined maximum pitch rate and yaw rate value.

In some examples, the comparing repeatedly the pitch rate and yaw rate indicated by the gyro signal with the maximum prescribed pitch rate and yaw rate comprises comparing the combined pitch rate and yaw rate value to the combined maximum pitch rate and yaw rate value. Some examples of the apparatus, system, and method described above further include a first circuit card assembly including the processor. Some examples further include a second circuit card assembly including an input and an output interface circuit. Some examples further include a third circuit card assembly including a power conditioning circuit.

Some examples of the apparatus, system, and method described above further include a fourth circuit card assembly including a connector and a connector circuit. Some examples of the apparatus, system, and method described above further include a first circuit card assembly including the processor and the position sensing system. Some examples of the apparatus, system, and method described above further include a second circuit card assembly including an input and an output interface circuit. Some examples further include a third circuit card assembly including a power conditioning circuit. Some examples of the apparatus, system, and method described above further include a fourth circuit card assembly including a connector and a connector circuit.

Some examples of the apparatus, system, and method described above further include a processor-readable memory comprising software. In some examples, the software comprises a mission data load file comprising rules for vehicle position, velocity and time, as well as termination logic, where the termination logic is configured to perform the activating of the flight termination system in the event the at least one termination condition selected from the group of termination conditions is detected.

In some examples, the software further comprises core autonomous safety software and position sensing system interface software (e.g., wrapper software) coupled to the core autonomous safety software. Some examples of the apparatus, system, and method described above further include a second circuit card assembly including an input and an output interface circuit. Some examples further include a third circuit card assembly including a power conditioning circuit. Some examples of the apparatus, system, and method described above further include a fourth circuit card assembly including a connector and a connector circuit.

A method for autonomous flight termination is described. One or more embodiments of the method include receiving repeatedly a location signal indicative of a position in three-dimensional space of a launch vehicle, comparing repeatedly the position indicated by the location signal with a planned flight envelope, receiving repeatedly a gyro signal indicative of a pitch rate and yaw rate of the launch vehicle, comparing repeatedly the pitch rate and yaw rate indicated by the gyro signal with a maximum prescribed pitch rate and yaw rate, and activating a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof.

An apparatus for autonomous flight termination is described. The apparatus includes a processor, memory in electronic communication with the processor, and instructions stored in the memory. The instructions are operable to cause the processor to perform the steps of receiving repeatedly a location signal indicative of a position in three-dimensional space of a launch vehicle, comparing repeatedly the position indicated by the location signal with a planned flight envelope, receiving repeatedly a gyro signal indicative of a pitch rate and yaw rate of the launch vehicle, comparing repeatedly the pitch rate and yaw rate indicated by the gyro signal with a maximum prescribed pitch rate and yaw rate, and activating a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof.

A non-transitory computer readable medium storing code for autonomous flight termination is described. In some examples, the code comprises instructions executable by a processor to perform the steps of: receiving repeatedly a location signal indicative of a position in three-dimensional space of a launch vehicle, comparing repeatedly the position indicated by the location signal with a planned flight envelope, receiving repeatedly a gyro signal indicative of a pitch rate and yaw rate of the launch vehicle, comparing repeatedly the pitch rate and yaw rate indicated by the gyro signal with a maximum prescribed pitch rate and yaw rate, and activating a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof.

A system for autonomous flight termination is described. One or more embodiments of the system include receiving repeatedly a location signal indicative of a position in three-dimensional space of a launch vehicle, comparing repeatedly the position indicated by the location signal with a planned flight envelope, receiving repeatedly a gyro signal indicative of a pitch rate and yaw rate of the launch vehicle, comparing repeatedly the pitch rate and yaw rate indicated by the gyro signal with a maximum prescribed pitch rate and yaw rate, and activating a flight termination system in the event at least one termination condition selected from a group of termination conditions is detected, the group of termination conditions including: the position being outside the planned flight envelope, the pitch rate and yaw rate exceeding the maximum prescribed pitch rate and yaw rate, and combinations thereof.

In some examples, the location signal is received repeatedly at a first sampling rate and the gyro signal is received repeatedly at a second sampling rate, where the second sampling rate is higher than the first sampling rate. In some examples, the location signal is received repeatedly at a first sampling rate and the gyro signal is received repeatedly at a second sampling rate, where the second sampling rate is lower than the first sampling rate. In some examples, the location signal is received repeatedly at a first sampling rate and the gyro signal is received repeatedly at a second sampling rate, where the second sampling rate is equal to the first sampling rate.

In some examples, the pitch rate and yaw rate indicated by the gyro signal comprises a separate pitch value and a separate yaw value, and where the maximum prescribed pitch rate and yaw rate comprises a separate maximum pitch value and a separate maximum yaw value. In some examples, the comparing repeatedly the pitch rate and yaw rate indicated by the gyro signal with the maximum prescribed pitch rate and yaw rate comprises comparing the separate pitch value to the separate maximum pitch value and comparing the separate yaw value to the separate maximum yaw value.

In some examples, the pitch rate and yaw rate indicated by the gyro signal comprises a combined pitch rate and yaw rate value, and where the maximum prescribed pitch rate and yaw rate comprises a combined maximum pitch rate and yaw rate value. In some examples, the comparing repeatedly the pitch rate and yaw rate indicated by the gyro signal with the maximum prescribed pitch rate and yaw rate comprises comparing the combined pitch rate and yaw rate value to the combined maximum pitch rate and yaw rate value.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While the invention herein disclosed has been described by means of specific embodiments, examples and applications thereof, numerous modifications and variations could be made thereto by those skilled in the art without departing from the scope of the invention set forth in the claims.

What is claimed is:

1. An autonomous flight safety system comprising:
a position sensing system communicatively coupled to a processor and comprising at least one sensor configured to sense a real-time position in three-dimensional space of a launch vehicle and generate a location signal indicative of the real-time position in three-dimensional space of the launch vehicle;
a three-axis gyro communicatively coupled to the processor and configured to generate a gyro signal indicative of a pitch rate and yaw rate of the launch vehicle;
a flight termination unit communicatively coupled to the processor and configured to terminate the launch vehicle upon activation of the flight termination unit; and
an autonomous flight termination unit comprising:
the processor;
processor-readable memory; and
software stored on the processor-readable memory and configured to run on the processor, wherein the autonomous flight termination unit is adapted to perform the following steps:
receive repeatedly, from the position sensing system, the location signal indicative of the real-time position in three-dimensional space of the launch vehicle;
receive repeatedly, with the three-axis gyro communicatively coupled to the processor, the gyro signal indicative of a pitch rate and yaw rate of the launch vehicle;
determine, repeatedly, using at least the gyro signal as input to an algorithm including pre-determined mission rules governing expected launch vehicle behavior, whether the launch vehicle is in an unstable condition, wherein the unstable condition includes tumbling of the launch vehicle, wherein the algorithm includes comparing the pitch rate and yaw rate indicated by the gyro signal with a maximum prescribed pitch rate and yaw rate; and
upon determining that the launch vehicle is in an unstable condition, activate the flight termination unit, whereby in response to the activation, the launch vehicle is terminated.

2. The autonomous flight safety system of claim 1 comprising:
said position sensing system comprising a global positioning system receiver.

3. The autonomous flight safety system of claim 2 comprising:
said position sensing system further comprising an inertial navigation system.

4. The autonomous flight safety system of claim 1 further comprising:
a global positioning system receiver; and
said autonomous flight termination unit, wherein said autonomous flight termination unit is coupled to the global positioning system receiver, wherein the global positioning system receiver generates said location signal, and wherein said position sensing system receives said location signal.

5. The autonomous flight safety system of claim 1 further comprising:
said autonomous flight termination unit, wherein said autonomous flight termination unit is adapted to perform the following steps:
said receiving repeatedly said location signal, wherein said receiving repeatedly said location signal is repeated at a first sampling rate;
said receiving repeatedly said gyro signal, wherein said receiving repeatedly said gyro signal is repeated at a second sampling rate, wherein said second sampling rate is higher than said first sampling rate.

6. The autonomous flight safety system of claim 1 further comprising:
said autonomous flight termination unit, wherein said autonomous flight termination unit is adapted to perform the following steps:
said receiving repeatedly said location signal, wherein said receiving repeatedly said location signal is repeated at a first sampling rate;
said receiving repeatedly said gyro signal, wherein said receiving repeatedly said gyro signal is repeated at a second sampling rate, wherein said second sampling rate is lower than said first sampling rate.

7. The autonomous flight safety system of claim 1 further comprising:
said autonomous flight termination unit, wherein said autonomous flight termination unit is adapted to perform the following steps:
said receiving repeatedly said location signal, wherein said receiving repeatedly said location signal is repeated at a first sampling rate;
said receiving repeatedly said gyro signal, wherein said receiving repeatedly said gyro signal is repeated at a second sampling rate, wherein said second sampling rate is equal to said first sampling rate.

8. The autonomous flight safety system of claim 1 further comprising: said autonomous flight termination unit adapted to perform the following steps:
said determining, repeatedly, using at least the gyro signal as input to an algorithm including pre-determined mission rules governing expected launch vehicle behavior, whether the launch vehicle is in an unstable condition;
said algorithm including comparing repeatedly the pitch rate and yaw rate indicated by the gyro signal with said maximum prescribed pitch rate and yaw rate, wherein the pitch rate and yaw rate indicated by the gyro signal comprise a separate pitch value and a separate yaw value, wherein said maximum prescribed pitch rate and yaw rate comprises a separate maximum pitch value and a separate maximum yaw value, and wherein said comparing repeatedly the pitch rate and yaw rate indicated by the gyro signal with said maximum prescribed pitch rate and yaw rate comprises:
comparing said separate pitch value to said separate maximum pitch value; and comparing said separate yaw value to said separate maximum yaw value.

9. The autonomous flight safety system of claim 1 further comprising:
said autonomous flight termination unit adapted to perform the following steps:
said determining, repeatedly, using at least the gyro signal as input to an algorithm including pre-determined mission rules governing expected launch vehicle behavior, whether the launch vehicle is in an unstable condition;
said algorithm including comparing repeatedly the pitch rate and yaw rate indicated by the gyro signal with said maximum prescribed pitch rate and yaw rate, wherein the pitch rate and yaw rate indicated by the gyro signal comprise a combined pitch rate and yaw rate value, wherein said maximum prescribed pitch rate and yaw rate comprises a combined maximum pitch rate and yaw rate value, and wherein said comparing repeatedly the pitch rate and yaw rate indicated by the gyro signal with said maximum prescribed pitch rate and yaw rate comprises:
comparing said combined pitch rate and yaw rate value to said combined maximum pitch rate and yaw rate value.

10. The autonomous flight safety system of claim 1 further comprising:
a first circuit card assembly including said processor;
a second circuit card assembly including an input and an output interface circuit; and
a third circuit card assembly including a power conditioning circuit.

11. The autonomous flight safety system of claim 10 further comprising:
a fourth circuit card assembly including a connector and a connector circuit.

12. The autonomous flight safety system of claim 1 further comprising:
a first circuit card assembly including said processor and said position sensing system.

13. The autonomous flight safety system of claim 12 further comprising:
a second circuit card assembly including an input and an output interface circuit; and
a third circuit card assembly including a power conditioning circuit.

14. The autonomous flight safety system of claim 12 further comprising:
a fourth circuit card assembly including a connector and a connector circuit.

15. The autonomous flight safety system of claim 12, wherein said software comprises:
a mission data load file comprising rules for vehicle position, velocity and time; and termination logic, wherein the termination logic is configured for use in the algorithm.

16. The autonomous flight safety system of claim 15 wherein said software further comprises:
core autonomous safety software; and
position sensing system interface software coupled to the core autonomous safety software.

17. The autonomous flight safety system of claim 15 further comprising:
a second circuit card assembly including an input and an output interface circuit; and
a third circuit card assembly including a power conditioning circuit.

18. The autonomous flight safety system of claim 17 further comprising:
a fourth circuit card assembly including a connector and a connector circuit.

19. An autonomous flight safety system comprising:
a position sensing system communicatively coupled to a processor and comprising at least one sensor configured to sense a real-time position in three-dimensional space of a launch vehicle and generate a location signal indicative of the real-time position in three-dimensional space of the launch vehicle;
a three-axis gyro communicatively coupled to the processor and configured to generate a gyro signal indicative of a pitch rate and yaw rate of the launch vehicle;
a flight termination unit communicatively coupled to the processor and configured to terminate the launch vehicle upon activation of the flight termination unit; and
an autonomous flight termination unit comprising:
the processor;
processor-readable memory; and
software stored on the processor-readable memory and configured to run on the processor, wherein the autonomous flight termination unit is adapted to perform the following steps:
receive repeatedly, from the position sensing system, the location signal indicative of the real-time position in three-dimensional space of the launch vehicle;
receive repeatedly, with the three-axis gyro communicatively coupled to the processor, the gyro signal indicative of a pitch rate and yaw rate of the launch vehicle;
determine, repeatedly, using at least the gyro signal as input to an algorithm including pre-determined mission rules governing expected launch vehicle behavior, whether the launch vehicle is in an unstable condition, wherein the unstable condition includes tumbling of the launch vehicle, wherein the algorithm includes comparing the pitch rate and yaw rate indicated by the gyro signal with a maximum prescribed pitch rate and yaw rate; and
upon determining that the launch vehicle is in an unstable condition, activate the flight termination unit, whereby in response to the activation, the launch vehicle is terminated.

20. The autonomous flight safety method of claim 19 further comprising:
said receiving repeatedly said location signal, wherein said receiving repeatedly said location signal is repeated at a first sampling rate;
said receiving repeatedly said gyro signal, wherein said receiving repeatedly said gyro signal is repeated at a second sampling rate, wherein said second sampling rate is higher than said first sampling rate.

21. The autonomous flight safety method of claim 19 further comprising:
said receiving repeatedly said location signal, wherein said receiving repeatedly said location signal is repeated at a first sampling rate;
said receiving repeatedly said gyro signal, wherein said receiving repeatedly said gyro signal is repeated at a second sampling rate, wherein said second sampling rate is lower than said first sampling rate.

22. The autonomous flight safety method of claim 19 further comprising:

said receiving repeatedly said location signal, wherein said receiving repeatedly said location signal is repeated at a first sampling rate;

said receiving repeatedly said gyro signal, wherein said receiving repeatedly said gyro signal is repeated at a second sampling rate, wherein said second sampling rate is equal to said first sampling rate.

23. The autonomous flight safety method of claim 19 further comprising:

said determining, repeatedly, using at least the gyro signal as input to an algorithm including pre-determined mission rules governing expected launch vehicle behavior, whether the launch vehicle is in an unstable condition;

said algorithm including comparing repeatedly the pitch rate and yaw rate indicated by the gyro signal with said maximum prescribed pitch rate and yaw rate, wherein the pitch rate and yaw rate indicated by the gyro signal comprise a separate pitch value and a separate yaw value, wherein said maximum prescribed pitch rate and yaw rate comprises a separate maximum pitch value and a separate maximum yaw value, and wherein said comparing repeatedly the pitch rate and yaw rate indicated by the gyro signal with said maximum prescribed pitch rate and yaw rate comprises:

comparing said separate pitch value to said separate maximum pitch value; and comparing said separate yaw value to said separate maximum yaw value.

24. The autonomous flight safety method of claim 19 further comprising:

said determining, repeatedly, using at least the gyro signal as input to an algorithm including pre-determined mission rules governing expected launch vehicle behavior, whether the launch vehicle is in an unstable condition;

said algorithm including comparing repeatedly the pitch rate and yaw rate indicated by the gyro signal with said maximum prescribed pitch rate and yaw rate, wherein the pitch rate and yaw rate indicated by the gyro signal comprise a combined pitch rate and yaw rate value, wherein said maximum prescribed pitch rate and yaw rate comprises a combined maximum pitch rate and yaw rate value, and wherein said comparing repeatedly the pitch rate and yaw rate indicated by the gyro signal with said maximum prescribed pitch rate and yaw rate comprises:

comparing said combined pitch rate and yaw rate value to said combined maximum pitch rate and yaw rate value.

* * * * *

UNITED STATES PATENT AND TRADEMARK OFFICE
CERTIFICATE OF CORRECTION

| | | |
|---|---|---|
| PATENT NO. | : 12,175,877 B2 | Page 1 of 1 |
| APPLICATION NO. | : 17/469024 | |
| DATED | : December 24, 2024 | |
| INVENTOR(S) | : Beard et al. | |

It is certified that error appears in the above-identified patent and that said Letters Patent is hereby corrected as shown below:

In the Claims
Claim 19, Column 28, Line 5, delete "system" and insert --method--.
Claim 19, Column 28, Lines 6-26, delete "a position sensing system communicatively coupled to a processor and comprising at least one sensor configured to sense a real-time position in three-dimensional space of a launch vehicle and generate a location signal indicative of the real-time position in three-dimensional space of the launch vehicle;
 a three-axis gyro communicatively coupled to the processor and configured to generate a gyro signal indicative of a pitch rate and yaw rate of the launch vehicle;
a flight termination unit communicatively coupled to the processor and configured to terminate the launch vehicle upon activation of the flight termination unit; and
an autonomous flight termination unit comprising:
the processor;
processor-readable memory; and
software stored on the processor-readable memory and configured to run on the processor, wherein the autonomous flight termination unit is adapted to perform the following steps:".
Claim 19, Column 28, Lines 27-30, delete "receive repeatedly, from the position sensing system, the location signal indicative of the" and insert --receiving repeatedly, from a position sensing system, a location signal indicative of a--.
Claim 19, Column 28, Lines 31-32, delete "receive repeatedly, with the three-axis gyro communicatively coupled to the processor, the" and insert --receiving repeatedly, with a three-axis gyro communicatively coupled to a processor, a--.
Claim 19, Column 28, Line 35, delete "determine," and insert --determining,--.
Claim 19, Column 28, Line 45, delete "activate" and insert --activating a flight termination unit communicatively coupled to the processor and configured to terminate the launch vehicle upon activation of--.

Signed and Sealed this
Eighth Day of April, 2025

Coke Morgan Stewart
*Acting Director of the United States Patent and Trademark Office*